United States Patent

(12) United States Patent
Haas

(10) Patent No.: US 12,327,648 B2
(45) Date of Patent: Jun. 10, 2025

(54) MOLTEN SALT REACTOR CONTAINMENT

(71) Applicant: Natura Resources LLC, Abilene, TX (US)

(72) Inventor: Derek Haas, Austin, TX (US)

(73) Assignee: Natura Resources LLC, Abilene, TX (US)

( * ) Notice: Subject to any disclaimer, the term of this patent is extended or adjusted under 35 U.S.C. 154(b) by 0 days.

(21) Appl. No.: 18/449,445

(22) Filed: Aug. 14, 2023

(65) Prior Publication Data

US 2025/0062046 A1    Feb. 20, 2025

(51) Int. Cl.
| G21C 1/02 | (2006.01) |
| G21C 1/32 | (2006.01) |
| G21C 13/08 | (2006.01) |
| G21G 1/02 | (2006.01) |
| G21C 9/016 | (2006.01) |

(52) U.S. Cl.
CPC .............. G21G 1/02 (2013.01); G21C 1/32 (2013.01); G21C 13/08 (2013.01); *G21C 9/016* (2013.01)

(58) Field of Classification Search
CPC ........ G21C 1/32; G21C 13/08; G21C 3/3213; G21C 3/54; G21C 9/016
See application file for complete search history.

(56) References Cited

U.S. PATENT DOCUMENTS

| 3,730,833 | A | * | 5/1973 | Cremeans | G21C 13/10 502/402 |
| 4,069,100 | A | * | 1/1978 | Cooper | G21C 13/10 376/205 |
| 4,186,049 | A | * | 1/1980 | Blum | G21C 13/0875 976/DIG. 200 |
| 5,406,602 | A | * | 4/1995 | Hunsbedt | G21C 15/18 376/293 |
| 6,299,950 | B1 | | 10/2001 | Byington et al. | |
| 7,160,367 | B2 | | 1/2007 | Babicki | |
| 7,648,792 | B2 | | 1/2010 | Kaschmitter | |
| 8,767,905 | B2 | | 7/2014 | Neeley et al. | |
| 9,305,673 | B2 | | 4/2016 | Heinold et al. | |

(Continued)

FOREIGN PATENT DOCUMENTS

| CA | 3085050 A1 * | 12/2021 |
| CN | 104916333 | 9/2015 |

(Continued)

OTHER PUBLICATIONS

Furuichi, K., et al. "Study on behavior of tritium in concrete wall." Journal of nuclear materials 350.3 (2006): 246-253. (Year: 2006).*

(Continued)

Primary Examiner — Lily C Garner
(74) Attorney, Agent, or Firm — King & Spalding

(57) ABSTRACT

A containment system for an integral molten salt reactor includes a sealed containment structure defining a containment volume. The containment structure includes a fission product adsorbing/absorbing material. The containment system further includes an integral molten salt reactor housed fully within the containment volume of the sealed containment structure. The integral molten salt reactor may permit circulation of a fuel salt therein being heated by fission reactions, and allow for the export of heat from said fuel salt.

19 Claims, 11 Drawing Sheets

(56) References Cited

U.S. PATENT DOCUMENTS

| | | | |
|---|---|---|---|
| 9,881,704 B2* | 1/2018 | Harris | G21C 13/022 |
| 10,043,594 B2* | 8/2018 | Scott | G21C 1/22 |
| 10,056,160 B2 | 8/2018 | LeBlanc | |
| 10,229,757 B2 | 3/2019 | Filippone | |
| 10,343,102 B2 | 7/2019 | Reasoner | |
| 10,510,450 B2* | 12/2019 | Arafat | G21C 5/14 |
| 10,566,101 B2* | 2/2020 | Corpora | G21C 19/307 |
| 11,145,424 B2* | 10/2021 | Abbott | G21C 3/44 |
| 11,276,503 B2 | 3/2022 | Cisneros, Jr. et al. | |
| 11,636,956 B2* | 4/2023 | Gauthe | G21C 15/26 376/277 |
| 11,756,698 B2 | 9/2023 | Reyes et al. | |
| 11,837,374 B2 | 12/2023 | Corbin et al. | |
| 12,018,779 B2* | 6/2024 | Bailey | G21C 3/54 |
| 2007/0193341 A1 | 8/2007 | Hoffmann | |
| 2009/0046825 A1 | 2/2009 | Dulka et al. | |
| 2012/0183112 A1* | 7/2012 | Leblanc | G21C 3/22 376/172 |
| 2015/0117589 A1* | 4/2015 | Kamei | G21C 15/243 376/347 |
| 2015/0228363 A1* | 8/2015 | Dewan | G21C 1/22 376/458 |
| 2015/0243376 A1* | 8/2015 | Wilson | G21D 5/08 376/347 |
| 2016/0217874 A1* | 7/2016 | Dewan | G21C 7/04 |
| 2018/0075931 A1* | 3/2018 | Arafat | G21C 7/10 |
| 2019/0035510 A1 | 1/2019 | LeBlanc | |
| 2019/0057783 A1 | 2/2019 | LeBlanc | |
| 2021/0343431 A1 | 11/2021 | Cisneros, Jr. | |
| 2022/0005619 A1 | 1/2022 | Cisneros, Jr. | |
| 2022/0051814 A1 | 2/2022 | Freeman et al. | |
| 2022/0208402 A1* | 6/2022 | Bass | G21C 9/004 |
| 2022/0254527 A1 | 8/2022 | Hinds | |
| 2022/0301729 A1* | 9/2022 | Cisneros, Jr. | G21C 1/326 |
| 2022/0328203 A1 | 10/2022 | Bass et al. | |
| 2023/0111998 A1* | 4/2023 | Leblanc | G21C 17/10 376/207 |
| 2023/0290528 A1 | 9/2023 | Venneri et al. | |
| 2024/0062922 A1* | 2/2024 | Acherr | G21C 9/016 |
| 2024/0062923 A1* | 2/2024 | Scherr | G21C 9/024 |
| 2024/0112822 A1 | 4/2024 | Lucas et al. | |
| 2024/0192123 A1* | 6/2024 | Robison | G01N 17/04 |
| 2024/0209626 A1 | 6/2024 | Morimoto et al. | |

FOREIGN PATENT DOCUMENTS

| | | | | |
|---|---|---|---|---|
| CN | 104916333 A * | 9/2015 | | |
| CN | 113851233 | 12/2021 | | |
| DE | 3614267 A1 * | 10/1987 | | |
| EP | 4352750 | 4/2024 | | |
| EP | 4354460 | 4/2024 | | |
| FR | 2837976 A1 * | 10/2003 | | G21C 9/016 |
| FR | 2951578 A1 * | 4/2011 | | G21C 15/18 |
| JP | 2022179393 A * | 12/2022 | | |
| JP | 2022182545 A * | 12/2022 | | |
| KR | 102495764 B1 * | 2/2023 | | |
| WO | WO 2015017928 | 2/2015 | | |
| WO | WO 2015089662 | 6/2015 | | |
| WO | WO-2015089662 A1 * | 6/2015 | | G21C 1/324 |
| WO | WO-2015089665 A1 * | 6/2015 | | G21C 1/22 |
| WO | WO-2017030107 A1 * | 2/2017 | | |
| WO | WO-2017205706 A1 * | 11/2017 | | G21C 15/18 |
| WO | WO 2018026429 | 3/2018 | | |
| WO | WO-2018067308 A2 * | 4/2018 | | B01J 14/00 |
| WO | WO 2018071635 | 4/2018 | | |
| WO | WO-2018071635 A1 * | 4/2018 | | |
| WO | WO 2018067308 | 5/2018 | | |
| WO | WO 2018147893 | 8/2018 | | |
| WO | WO 2022061195 | 4/2022 | | |

OTHER PUBLICATIONS

Furuichi et al. "Study on behavior of tritium in concrete wall," Journal of nuclear materials 350.3 (2006): 246-253.

\* cited by examiner

MOLTEN SALT REACTOR CONTAINMENT

TECHNICAL FIELD

The described examples relate generally to systems, devices, and techniques for an integral molten salt reactor, including reactors in which components functionally associated with the reactor are enclosed with the reactor containment.

BACKGROUND

Molten salt reactors (MSRs) offer an approach to nuclear power that can utilize molten salts as their nuclear fuel in place of the conventional solid fuels used in light water reactors. Advantages include efficient fuel utilization and enhanced safety (largely due to replacing water as a coolant with molten salt). In some MSRs, fission reactions can occur within a molten salt composition housed within a reactor vessel. In certain conventional MSRs, fuel salt undergoes a fission reaction in a reactor vessel. Such conventional MSRs may operate by pumping the fuel salt from the reactor vessel along a "loop," first to a primary heat exchanger, and then back to the reactor vessel so that the fuel salt may re-enter the reactor vessel for subsequent fission reactions. The reactor vessel, pump(s), heat exchanger(s) and/or other components may be fluidly coupled to one another by a series of pipes, flanges, and other connections, which may each present the possibility for leaks or other failure mechanisms. In some conventional systems, the functional components of the MSR may be arranged fully within an integral enclosure in order to form an integral or "pool-type" reactor whereby the fuel salt circulates between a reactor core and heat exchangers within a common vessel. While such integral reactor may reduce the possibly for leaks and/or other failure mechanisms, such conventional integral reactors may lack suitable containment about various additional or ancillary functional components of the reactor, including certain coolant systems, pumping systems, control systems, fuel loading systems, and inert gas systems. Further, certain conventional integral reactors may require an off-gas system or other system by which to remove gas from the integral vessel in order to mitigate gas release from fuel salts over time. Accordingly, conventional integral MSRs may lack the ability to passively contain fission products that release from the integral vessel, and in particular containing any fission products about such ancillary components of the reactor, and as such, there remains a need for improved MSR systems that provide such functionality.

SUMMARY

In one example, a containment system for an integral molten salt reactor is disclosed. The containment system includes a sealed containment structure defining a containment volume. The containment structure includes a fission product adsorbing/absorbing material. The containment system further includes an integral molten salt reactor housed fully within the containment volume of the sealed containment structure. The integral molten salt reactor permits circulation of a fuel salt therein that is heated by fission reactions, and allows for export of heat from said fuel salt.

In another example, the sealed containment structure may include an integral molten salt reactor section configured to house the integral molten salt reactor therein and within the containment volume. In this regard, the sealed containment structure may further include a maintainable components section extending continuous from the integral molten salt reactor section and configured to house a collection of maintainable components that are associated with an operation of the integral molten salt reactor.

In another example, the fission product adsorbing/absorbing material may extend throughout both of the integral molten salt reactor section and the maintainable components section, and further encompass each of the integral molten salt reactor and the collection of maintainable components.

In another example, the collection of maintainable components may include one or more pumps, valves, compressors, or heat exchangers.

In another example, the fission product adsorbing/absorbing material may include iodine and/or tritium and/or noble gas adsorbing and/or absorbing material.

In another example, the sealed containment structure and the fission product adsorbing/absorbing material included therein may cooperate to retain fission gasses upon a release event of said fission gasses from the integral molten salt reactor.

In another example, the sealed containment structure and the fission product adsorbing/absorbing material included therein may cooperate to retain such fission product gasses free from an external off-gas system.

In another example, the integral molten salt reactor may include an integrally constructed vessel having a drain tank section configured to hold a volume of fuel salt. The integrally constructed vessel may further include a reactor section configured to receive the volume of fuel salt from the drain tank and heat the fuel salt through fission reactions. The integrally constructed vessel may further include a heat exchange section configured to receive a flow of the heated fuel salt from the reactor section and remove heat therefrom. The integrally constructed vessel may further include a fission gas void section defining a head space of the integral molten salt reactor configured to hold a gas emanating from the fuel salt.

In another example, the reactor section, the heat exchange section, and the fission gas void may collectively define a critical region of the vessel. In this regard, the drain tank section may define a subcritical region of the vessel.

In another example, the critical region may define a critical volume for fission reactions and for the circulation of a fuel salt therethrough. Further, the subcritical region may define a subcritical volume for the storage of the fuel salt away from a reactor core. In this regard, in response to a shutdown event, the fuel salt is passively transferable from the critical volume to the subcritical volume.

In another example, a containment system for an integral molten salt reactor is disclosed. The containment system includes a sealed containment structure defining a containment volume. The containment structure includes a fission product adsorbing/absorbing material. The containment system further includes an integral molten salt reactor housed fully with the containment volume of the sealed containment structure. The integral molten salt reactor includes a fission gas void section defining a head space of the integral molten salt reactor configured to hold a gas emanating from a fuel salt that is circulated within the reactor.

In another example, the sealed containment structure may be configured to enclose a collection of maintainable components associated with the operation of the integral molten salt reactor. In this regard, the fission product adsorbing/absorbing material may be arranged to surround the collection of maintainable components within the sealed containment structure.

In another example, the sealed containment structure may be configured to permit access to the maintainable components without disturbing the fuel salt of the integral molten salt reactor held within the sealed containment structure.

In another example, the integral molten salt reactor may be configured to permit circulation of the fuel salt therein that is heated by fission reactions, and to allow for the export of heat from said fuel salt. In this regard, the fission gas void may collect off-gas free from additional piping, compressors, and valving of an external off-gas system.

In another example, the integral molten salt nuclear reactor may include a critical region defining a critical volume for fission reactions and for the circulation of the fuel salt therethrough. The integral molten salt nuclear reactor may further include a subcritical region defining a subcritical volume for the storage of the fuel salt away from a reactor core. In this regard, the sealed containment structure and the fission product adsorbing/absorbing material included therein cooperate to retain fission gasses upon a release event of said fission gasses from either the critical volume or the subcritical volume.

In another example, a method of operating a containment system including an integral molten salt nuclear reactor is disclosed. The method includes operating an integral molten salt reactor that is housed fully within a containment volume of a sealed containment structure. The integral molten salt reactor permits circulation of a fuel salt therein, and allows for export of heat from said fuel salt. The method further includes, upon a release event from the integral molten salt reactor, retaining fission gases within the containment volume using the fission product adsorbing/absorbing material in cooperation with the sealed containment structure.

In another example, the method further includes collecting gas emanating from the fuel salt circulated within the integral molten salt reactor in a fission gas void section defining a head space of the reactor.

In another example, the method further includes, upon the release event, adsorbing and/or absorbing iodine and/or tritium and/or noble gas from the fission gases.

In another example, the method further includes holding the containment volume under negative pressure. In this regard, the method further includes using the containment volume to provide a thermal barrier between the integral molten salt reactor and an environment exterior to the sealed containment structure.

In another example, the sealed containment structure may be configured to enclose a collection of maintainable components associated with the operation of the integral molten salt reactor. In this regard, the method may further include, prior to the release event, accessing the maintainable components without disturbing the fuel salt of the integral molten salt reactor held within the sealed containment structure.

In addition to the example aspects described above, further aspects and examples will become apparent by reference to the drawings and by study of the following description.

Figure 1:
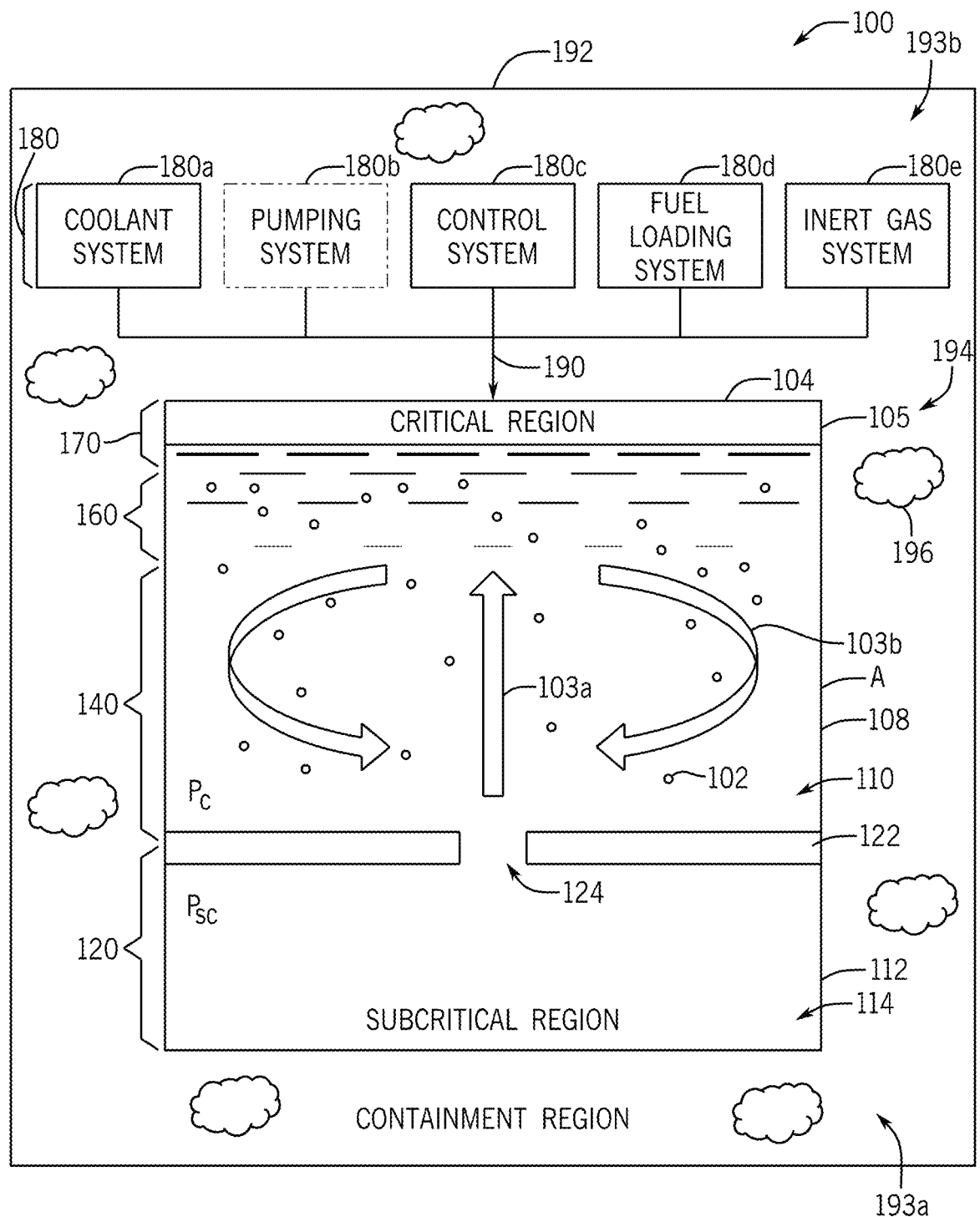
FIG. 1 depicts a schematic representation of an example containment system for an integral molten salt nuclear reactor in a first configuration.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

The description that follows includes sample systems, methods, and apparatuses that embody various elements of the present disclosure. However, it should be understood that the described disclosure may be practiced in a variety of forms in addition to those described herein.

The following disclosure relates generally to integral or "pool-type" molten salt reactors (MSRs). An "integral" MSR may generally refer to a MSR in which the components of the reactor functionally associated with the reactor may be disposed inside a common enclosure with the reactor core. For example, conventional, non-integral MSR systems, may operate by pumping the fuel salt from the reactor vessel along a "loop," first to a primary heat exchanger, and then back to the reactor vessel so that the fuel salt may re-enter the reactor vessel for subsequent fission reactions. The reactor vessel, pump(s), heat exchanger(s) and/or other components may be fluidly coupled to one another by a series of pipes, flanges, and other connections, which may each present the possibility for leaks and/or other failure mechanisms. An integral MSR may reduce or eliminate such leaks and/or other failure mechanisms by fully enclosing the functional components (e.g., the heat exchanger, the reactor core, the pump (if used), and so on) within a common, integrally constructed vessel. For example, conventional integral MSRs may house a reactor core and one or more heat exchangers in a common vessel, and cause a fuel salt to circulate within the common vessel between the reactor core (at which the fuel salt may undergo a fission reaction that heats the salt) and a heat exchanger (at which the heat is removed from the fuel salt). However, conventional integral MSRs may lack suitable containment about various additional or ancillary functional components of the reactor, including certain coolant systems, pumping systems, control systems, fuel loading systems, and inert gas systems, all of which are collectively referred to herein as "maintainable components." Accordingly, integral MSRs may lack the ability to passively contain fission products that release from the integral vessel, and in particular containing any fission products about such ancillary components of the reactor, and as such, there remains a need for improved MSR systems that provide such functionality.

To mitigate these and other challenges, disclosed herein is a containment system for such integral MSRs. The containment system generally includes a sealed containment structure that defines a sealed containment volume. The sealed containment volume may be sufficiently sized and shaped in order to fully accommodate and encompass both the integral MSR and any maintainable components associated therewith. For example, the sealed containment structure may include an integral MSR or molten salt reactor section and a maintainable components section. The integral MSR reactor section may be configured to house and fully encompass an integral MSR, such as any of the integral MSRs described herein. The maintainable components section may extend continuous from the integral MSR section and be configured to house and fully encompass a collection of maintainable components therein, for example, including certain components associated with one or more of a coolant system, a pumping system, a control system, a fuel loading system, an inert gas system and/or other associated system. By arranging the integral MSR and the maintainable components in the same, common containment volume, the containment system may operate to contain any fission products released from either the integral MSR and/or the maintainable component within the containment structure. Further, the containment structure may be accessible for maintenance and/or replacement of the maintainable components without disturbing the integral MSR and the fuel contained therein.

To facilitate the foregoing containment of the fission products, the sealed containment structure may include a fission product adsorbing/absorbing material that extends throughout both the integral MSR section and the maintainable components section. The fission product adsorbing/absorbing material may therefore encompass each of the integral molten salt reactor and any components of the collection of maintainable components. The fission product adsorbing/absorbing material may generally operate as a component that facilitates the passive removal of fission products that are introduced into the sealed containment volume. In this regard, the fission product adsorbing/absorbing material may be formed from an iodine and/or tritium and/or noble gas, adsorbing and/or absorbing material; however, in other examples, other materials are possible and contemplated herein. Such fission product adsorbing/absorbing material may retain fission gasses upon a release event of said fission gasses from the integral MSR and/or maintainable components, which may include an emergency or otherwise unplanned release event.

Further, the construction of the containment system described herein may facilitate the removal of an off-gas system that is found in operation with certain conventional integral MSRs. For example, in many conventional MSRs, an off-gas system is provided in order to manage the gas and aerosol stream that may come from the fuel salt within various headspaces of the system. Such off-gas systems may capture this stream for radioactive decay and clean the gas prior to releasing it when appropriate. Despite these benefits, an off-gas system may involve additional complexity, costs, and may present additional potential leak paths and failure points. The containment systems and integral MSRs of the present disclosure may help to eliminate the need for an off-gas system. As one example, the integral MSRs of the present disclosure may be constructed to include a fission gas void section that defines a head space of the integral MSR configured to hold a gas emanating from the fuel salt. The fission gas void section may be sufficiently sized and shaped in order to hold a volume of such fission gas for the entire operational life of the integral MSR. Further, the containment system itself may support the removal of the off-gas system by providing the sealed containment volume (with the fission product adsorbing/absorbing material packed therein) fully about the integral MSR and all of the maintainable components included therein. For example, the fission gas void space alone may be sufficient to hold all gas emanating from the fuel salt, but in the event that some portion of said gas leaks from the integral vessel and/or via the maintainable components, the fission product adsorbing/absorbing material in cooperation with the sealed containment structure may operate to capture such gas, thereby preventing the release of such gas outside of the containment volume.

Turning to the Drawings, FIG. 1 depicts a schematic representation of an example containment system 100. The containment system 100 is shown schematically as including a sealed containment structure 192 that defines a containment volume 194. The sealed containment structure 192 may broadly include both an integral molten salt reactor section 193a and a maintainable components section 193b. The maintainable components section 193b may extend continuous from the integral molten salt reactor section 194a such that, in some cases, the entire containment volume 194 is defined collectively, by the molten salt reactor section 194a and the maintainable component section 193b together. The integral molten salt reactor section 193a may be configured to house any of a variety of integral MSRs therein such that the integral MSR is fully encompassed and enclosed by the sealed containment structure 192. Any such integral MSR placed therein may require certain systems, assemblies, components or other maintainable components to operate, including, without limitation, those associated with a coolant system, a pumping system, a control system, a fuel loading system, and/or an inert gas system. Such maintainable components may be arranged adjacent to the integral MSR to facilitate such operation. Accordingly, the maintainable components section 193b may be configured to house a collection of such maintainable components such that maintainable components may also be fully enclosed and encompassed by the sealed containment structure 192.

Further shown schematically in FIG. 1 is fission product adsorbing/absorbing material 196. The fission product adsorbing/absorbing material 196, as described herein, may include any appropriate material to trap fission gasses, including being formed from certain iodine and/or tritium and/or noble gas adsorbing and/or absorbing materials. The fission product adsorbing/absorbing material 196 may be arranged throughout the containment volume 194 as a sort of loose or packed fill about the vessels, components, and systems (e.g., including certain reactor vessels, pumps, valves, compressor, heat exchangers, and so on). For example, the fission products adsorbing/absorbing material 196 may extend throughout the integral MSR section 193a and partially or fully surround any integral MSR held therein. Further, the fission products adsorbing/absorbing material 196 may extend throughout the maintainable components section 193b and partially or fully surround any maintainable components held therein. In this regard, the fission products adsorbing/absorbing 196 material may operate to capture gas which could possibly emanate from either such integral MSR or maintainable components.

It will be appreciated that the containment system 100 described herein can broadly be used to house and encompass generally any time of integral MSR and maintainable components. With reference to FIG. 1, an integral MSR 104 is shown for purposes of illustration that is housed in and encompassed by the sealed containment structure 192 and at least partially surrounded by the fission product adsorbing/absorbing material 196 in the integral molten salt reactor section 193a. In other cases, the containment structure 192 may be used to house and encompass other types and arrangements of integral MSRs. As described herein below, the containment system 100 may also facilitate the operation of an integral MSR therein free from any active off-gas system. Accordingly, the integral MSR 104 shown and described herein may be constructed in a manner to cooperate with the containment system 100 to facilitate the removal of such off-gas system, for example, by including a fission gas void space in a head space of integral MSR 104, among other features described herein.

In the example of FIG. 1, the integral MSR 104 is shown in a first configuration A in which a fuel salt 102 is circulated in a critical region 108 of the integral MSR 104 for generation and removal of heat caused by fission reactions. The integral MSR 104 is shown schematically as including a common, integrally constructed vessel 105. The vessel 105 may define both the critical region 108 and a subcritical region 112. The critical region 108 may define a critical volume 110 for the circulation of the fuel salt 102 and for the housing of fission reactions occurring therein. Further, the subcritical region 112 may define a subcritical volume 114 for the storage of the fuel salt 102 away from a reactor core or otherwise away from the critical region 108. As generally shown in FIG. 1, the critical region 108 may circulate the fuel salt 102 along a circulation flow path therein including a flow 103a through a reactor section 140 where the fuel salt 102 may generally be heated due to fission reactions occurring therein. As further shown in FIG. 1, the critical region 108 may circulate the fuel salt 102 along a circulation path therein including a flow 103b through a heat exchange section 160 and back to the reactor section 140 for recirculation via the flow 103a. At the heat exchange section 160, heat may be removed from the fuel salt 102 in order to circulate a cooler fuel salt 102 back to the reactor section 140 so that the fuel salt 102 may again be heated along the flow 103a. The circulation of the fuel salt 102 along the flows 103a, 103b may proceed continuously in order to provide a generally constant, steady stream of heat from the fission reactions to the heat exchangers of the system 104.

The integrally constructed vessel 105 is further shown in FIG. 1 as including the fission gas void section 170 in the critical region 108. The fission gas void section 170 may be a head space of the critical region 108, and of the vessel 105 more generally. The fission gas void section 170 may be adapted to receive any and all fission gasses that may emanate from the fuel salt 102 during the operation of the integral MSR 104. In this regard, the fission gas void section 170 may be sufficiently sized and shaped to capture such fission gasses from the fuel salt 102 over a lifetime of integral MSR 104.

The integrally constructed vessel 105 is shown in FIG. 1 as including the subcritical region 112 therein, which may establish a drain tank section 120 of the integral MSR 104. Accordingly, the integral MSR 104 may be operable to maintain the fuel salt 102 in both a critical state, and a subcritical state, within the same, integrally constructed vessel 105. The subcritical volume 114 of the subcritical region 112 is shown separated from the critical volume 110 by an internal barrier 122. The internal barrier 122 may further define a fuel salt passage 124 therethrough in order to establish a flow path for the fuel salt 102 between the critical volume 110 and the subcritical volume 114.

The fuel salt 102 may be selectively held within the critical volume 110 and/or the subcritical volume 114 based on the maintenance of an inert gas pressure within each volume. For example, the critical volume 110 may be held at a pressure $P_c$ and the subcritical volume may be held at a pressure $P_{sc}$. In the example of FIG. 1, in which the fuel salt 102 is circulated in the critical region 108, the integral MSR 104 may operate to maintain the pressure $P_{sc}$ at a value that is greater than the pressure $P_c$. Accordingly, the fuel salt passage 124 may be pressurized to mitigate or prevent the introduction of fuel salt 102 into the subcritical volume 114 during the first configuration A, shown in FIG. 1. As described herein, the pressures $P_c$, $P_{sc}$ may be manipulated in various manners in order to control the disposition of the fuel salt 102 as between the critical region 108 and the subcritical region 112.

The integral MSR 104 is also shown in FIG. 1 with various maintainable components 180. Broadly, the maintainable components 180 may include any components that may be used to facilitate one or more operations of the integral MSR 104. It may be desirable to include such maintainable components 180 within the maintainable components section 193b of the containment volume 194. For example, placement of the maintainable components 180 in the maintainable components section 193b may allow the sealed containment structure 192 and the fission product adsorbing/absorbing material 196 to capture any fission gasses which could potentially leak or emanate from a leak path provided by components of the maintainable components 180. Placement of the maintainable components 180 in the maintainable component section 193b may also allow such maintainable components 180 to be accessed for maintenance and/or replacement separate from the integral MSR and any fuel contained therein.

In the example of FIG. 1, the maintainable components 180 are shown as including a coolant system 180a, an optional pumping system 180b, a control system 180c, a fuel loading system 180d, and an inert gas system 180e. Each such operational system may be broadly used to control or support one or more functions of the integral MSR 104 that occur in the vessel 105. Accordingly, the schematic diagram of FIG. 1 shows such maintainable components 180 as being coupled to the vessel 105 via an operative connection 190. The operative connection 190 may be indicative of any of a variety of mechanical, electrical, and fluidic control and coupling devices (including assemblies and subassemblies thereof), further examples of which are described in greater detail with reference to FIGS. 4-8 herein.

With reference to the coolant system 180a, the coolant system 180a may operate to facilitate the removal of heat from the fuel salt 102 that is circulated through the critical region 108. The coolant system 180a may further operate to facilitate the transfer of such heat to further uses, such as transferring the heat for use in an electricity generation process, a chemical process, and/or any other operation in which heat may be used. For example, the coolant system 180a may include one or more coolant salt loops that circulate a coolant salt between the heat exchange section 160 of the critical region 108 and a secondary heat exchanger of the coolant system 180a. The coolant salt receives the heat from the fuel salt 102 and allows such heat to be removed by a secondary coolant at the secondary heat exchanger for transfer of heat to another process.

With reference to the pumping system 180b, the pumping system 180b may operate to cause the fuel salt 102 to circulate along the flows of 103a, 103b. For example, the pumping system 180b may include a pump (including a magnetic drive pump) having an impeller at least partially immersed in the fuel salt 102 in order to drive the flow of the fuel salt 102 by operation of the impeller. The pumping system 180b is depicted in phantom line in FIG. 1 and may be an optional component of the integral MSR 104. For example, in some cases, the pumping system 180b may be entirely omitted from the integral MSR 104. In such cases, the integral MSR 104 may be configured to cause the fuel salt 102 to circulate via the flows 103a, 103b via a convective process. For example, as the fuel salt 102 is heated at the reactor section 140, the fuel salt 102 may generally be permitted to rise and follow the flow path 103a. In turn, as heat is removed from the fuel salt 102 at the heat exchange section 160, the fuel salt 102 may generally be permitted to sink and follow the flow path 103b. In some cases, a combination of active pumping and a convective process may be used to facilitate the flows 103a, 103b.

With reference to the control system 180c, the control system 180c may include any appropriate components to facilitate reactivity control. In some cases, the control system 180c may include one or more control rods that may be selectively insertable into the critical region 108 of the vessel 104 in order to slow down, or stop, a nuclear reaction occurring therein. Additionally or alternatively, reactivity may be controlled via coolant flow rates and fuel salt level adjustments, either of which may remove the need for control rods.

With reference to the fuel loading system 180d, the fuel loading system 180d may operate to load the fuel salt 102 into the vessel 105. As described in greater detail herein, such fuel loading system 10d6 may permit the fuel salt 102 to be first loaded into the subcritical region 112. Then, in response to an operation event, the fuel salt 102 may be transferred to the critical region 108, for example, by control of the pressures $P_c$, $P_{sc}$. With reference to the inert gas system 180e, the inert gas system 180e may operate to control such pressures $P_c$, $P_{sc}$. For example, and as described in greater detail herein, the inert gas system 188 may be operatively coupled to a supply of inert gas, such as a helium gas. The inert gas system 188 may be further operated to supply such inert gas, selectively, to each of the critical volume 110 and the subcritical volume 114. As such, the inert gas system 180e may be used to control the pressures $P_c$, $P_{sc}$, which, as described herein, may be used to cause the fuel salt to be disposed in one of the critical region 108 or the subcritical region 112 based on an operational state of the integral MSR 100.

The integral MSR 104 is shown in FIG. 1 being free from any off-gas system. For example, the integral MSR 104 is shown in FIG. 1 as being free from any system that may actively remove fission gasses from the vessel 105, such as for capture for radioactive decay and cleaning of such gasses. Rather, the combination of the construction of the vessel 105 and the containment structure 102 may operate to provide for a sufficient safety level or metric for the system 100 that such conventional off-gas system is not needed. For example, the vessel 105 may be constructed with the fission gas void section 170 that defines a head space of the vessel that is sufficiently sized and shaped in order to capture and hold a gas emanating from the fuel salt 102, such as being sized and shaped in order to hold the entire quantity of gas from the fuel salt 102 that would be emitted during the operational life of the integral MSR 104. Accordingly, any such fission or off gas should be retained fully within the vessel 105 during the operational life of the integral MSR 104. The containment structure 192 provides an additional level of safety to the integral MSR 104 by fully encompassing the integral MSR 104 within a containment volume 194 that is packed with a fission product adsorbing/absorbing material 196. As such, were any fission or off-gas from the fuel salt 102 be released from the fission gas void section 170, such gas would be captured by the fission product adsorbing/absorbing material 196 and would be contained within the containment volume 194 of the sealed containment structure 192. The fission gas void section 170, the adsorbing/absorbing material 196, and the containment volume 194 therefore provide multiple layers of redundancy that allow the integral MSR 104 to operate without or free from any conventional off-gas system.

Figure 2:
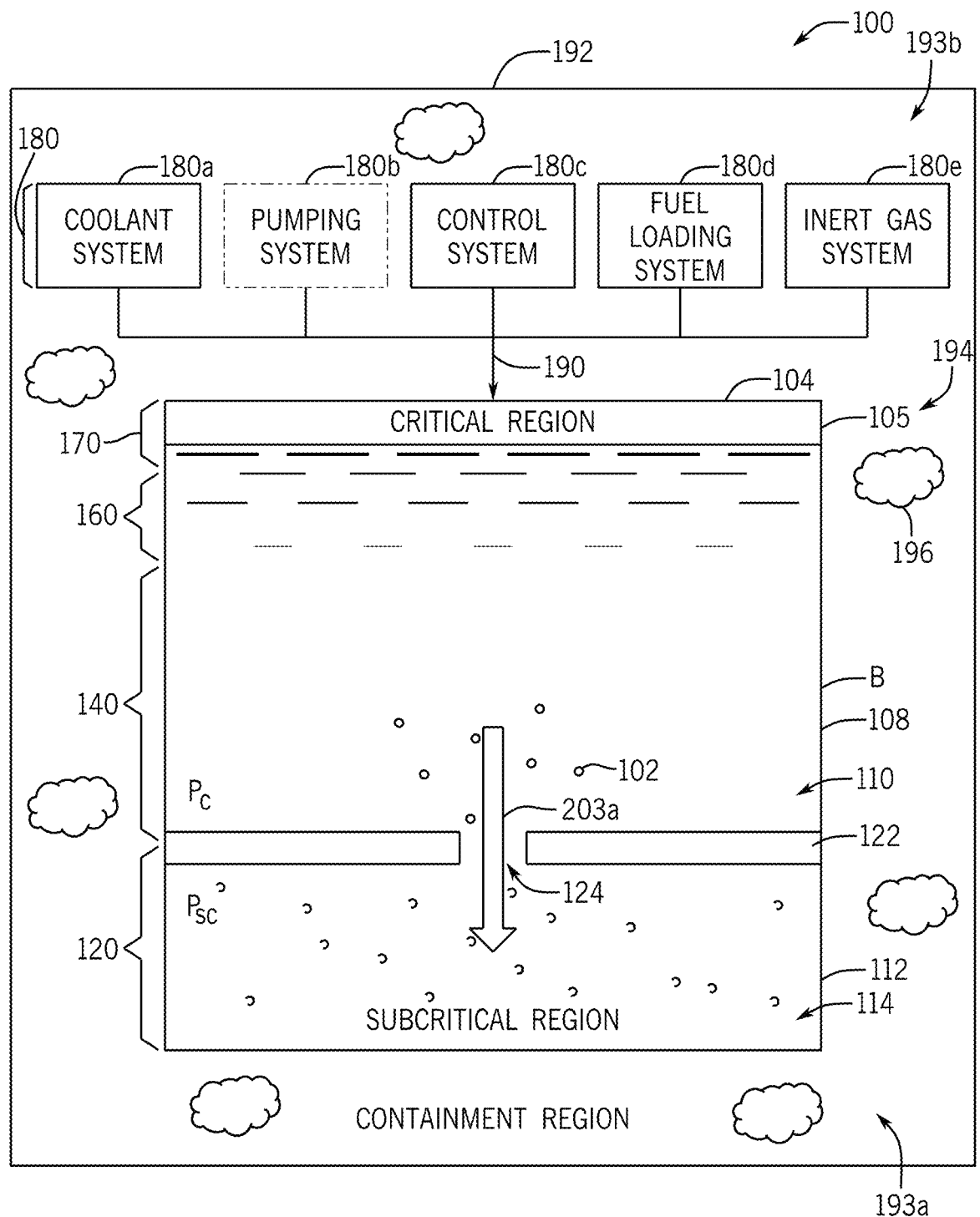
FIG. 2 depicts a schematic representation of the containment system of FIG. 1 in a second configuration.

Turning to FIG. 2, a schematic representation of the integral MSR 104 is shown in a second configuration B and within the sealed containment structure 192. In the second configuration B, the fuel salt 102 may be passively transferred to the subcritical region 112. For example, the fuel salt 102 may be caused to progress along a flow 203a that proceeds from the critical region 108 to the subcritical region 112. Transferring of the fuel salt 102 to the subcritical region 112 in this manner may allow the fuel salt 102 to be physically separated from the reactor core and/or other components of the critical region 108. Accordingly, the fuel salt 102 may be held away from such components so that the fuel salt 102 may cease being heated or otherwise be removed from certain fission reactions of the critical region 108.

To facilitate the foregoing, the inert gas system 180e may control the pressures $P_c$, $P_{sc}$. For example, the inert gas system 180e may cause the pressure $P_{sc}$ to be less than or equal to the $P_c$. As such, the fuel salt passage 124 may become depressurized so that the pressure of the fuel salt passage 124 no longer mitigates or prevents the fuel salt 102 from flowing therethrough. Rather, on the depressurization of the fuel salt passage 124, the fuel salt 102 may gravitationally flow through the fuel salt passage 124 and into subcritical region 112. The integral MSR 104 may therefore be considered "walk-away" safe because the passive or default state or configuration is one in which the fuel salt 102 is held away from the critical region 108 so that the fuel salt 102 is not subject to excessive heating.

Figure 3:
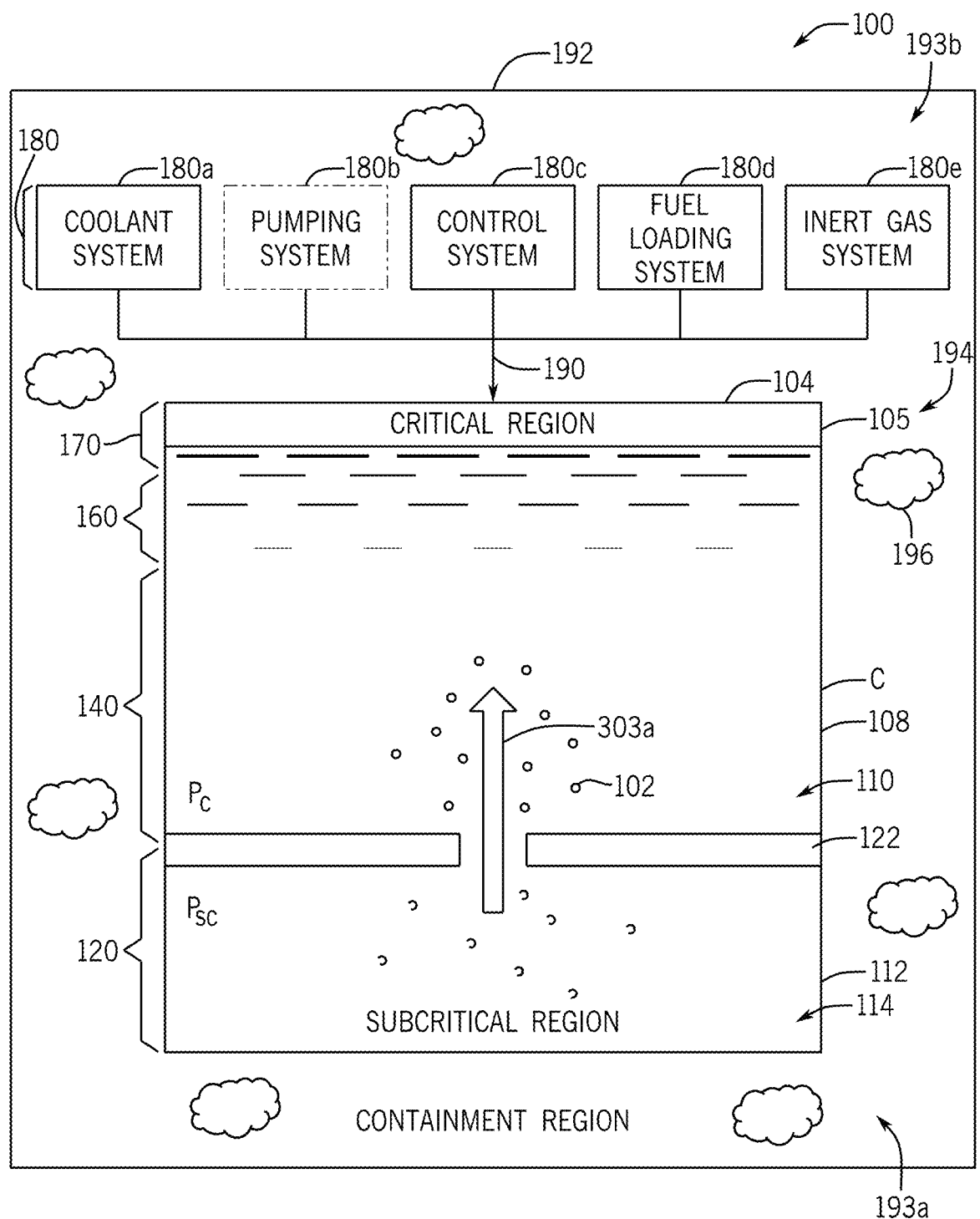
FIG. 3 depicts a schematic representation of the containment system of FIG. 1 in a third configuration.

Turning to FIG. 3, a schematic representation of the integral MSR 104 is shown in a third configuration C and within the sealed containment structure 192. In the third configuration C, the fuel salt 102 may be actively transferred to the critical region 108. For example, the fuel salt 102 may be caused to progress along a flow 303a that proceeds from the subcritical region 112 to the critical region 108. Transferring of the fuel salt 102 to the critical region 108 in this manner may allow the fuel salt 102 held in the subcritical geometry to be used in conjunction with fission reactions for the generation of heat in the critical region 108. To facilitate the foregoing, the inert gas system 180e may control the pressures $P_c$, $P_{sc}$. For example, the inert gas system 180e may cause the pressure $P_{sc}$ to be greater than the pressure $P_c$. As such, the fuel salt 102 held in the subcritical volume 114 may be encouraged to travel through the fuel salt passage 124 and into the critical volume 110. The inert gas system 180e may further operate to maintain the pressure $P_{sc}$ as being greater that the pressure $P_c$ so as to maintain the fuel salt passage 124 is a pressurized state such that the fuel salt 102 is mitigated or prevented from entering the subcritical region 112, as described in relation to FIG. 1. Because the act of transferring the fuel salt 102 from the subcritical region 112 to the critical region 108 is the result of active pressurization, upon the loss of such pressure (e.g., due to emergency event, including a loss of power), the fuel salt 102 will be encouraged to passively drain or dump back to the subcritical region 112, for example, using the fuel salt passage 124.

Figure 4:
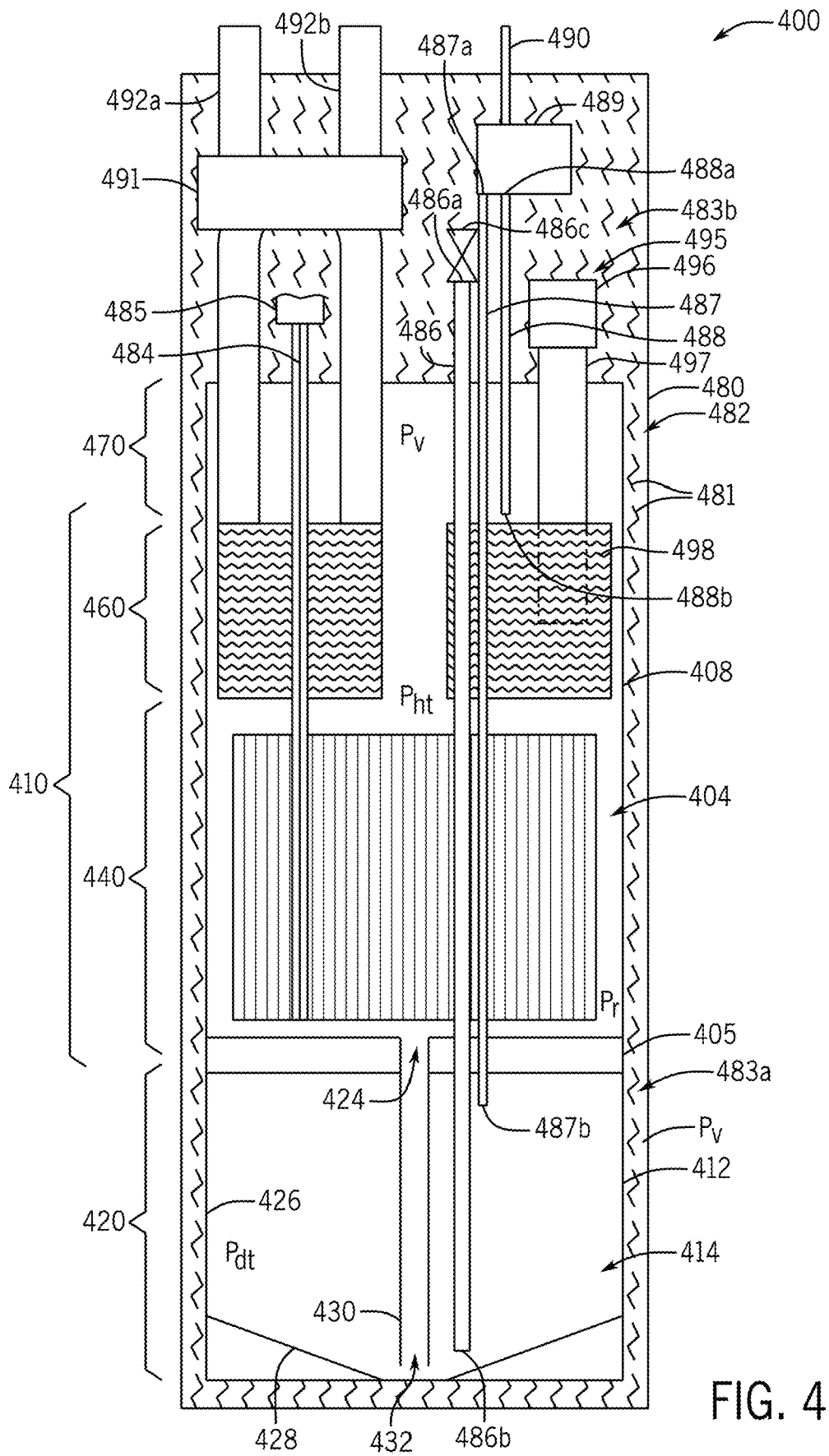
FIG. 4 depicts another containment system for an integral molten salt nuclear reactor.
Figure 5:
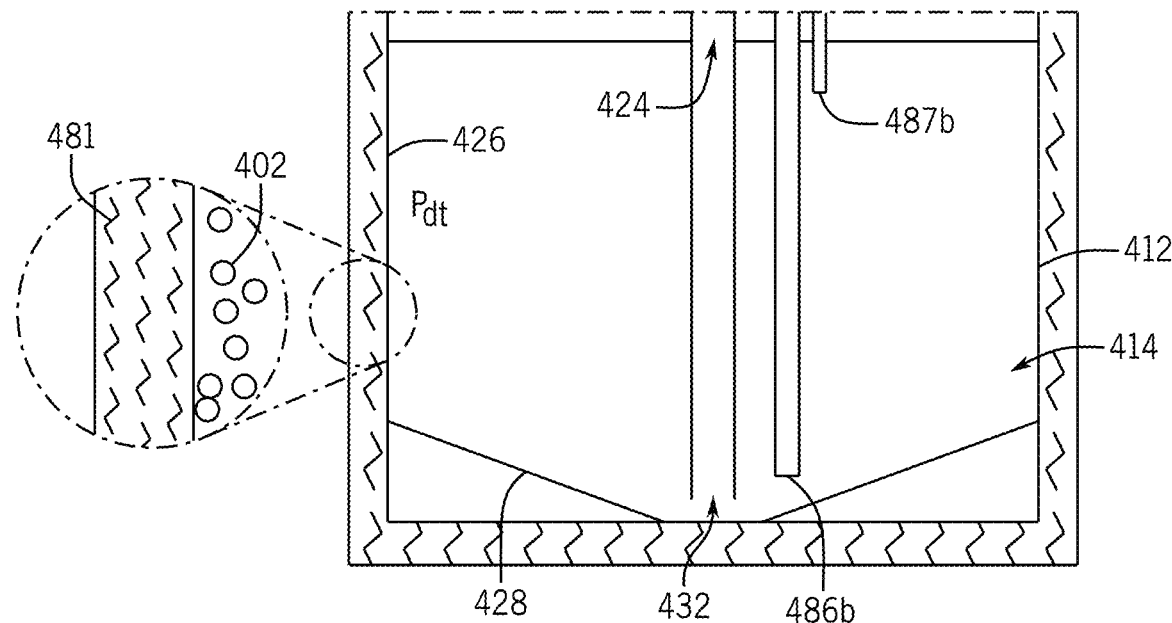
FIG. 5 depicts a drain tank section of the integral molten salt reactor of FIG. 4 and adjacent fission product adsorbing/absorbing material.

It will be appreciated that the containment systems and associated integral MSRs described herein may be implemented with a variety of components, systems, and subassemblies. With reference to FIG. 4, another example containment system including an integral MSR of the present disclosure is depicted, which may represent one example implementation of the containment systems and integral MSRs described herein. In this regard, FIG. 4 depicts a containment system 400 and an integral MSR 404. The containment system 400 may be substantially analogous to the containment system 100 and include a sealed containment structure 480, a sealed containment volume 482, a fission product adsorbing/absorbing material 481, an integral molten salt reactor section 483a, and a maintainable components section 483b. The integral MSR 404 may be substantially analogous to the integral MSR 104 described above in relation to FIGS. 1-3 and may include an integrally constructed vessel 405, a critical region 408, a critical volume 410, a subcritical region 412, a subcritical volume 414, a drain tank section 420, an internal barrier 422, a fuel salt passage 424, a reactor section 440, a heat exchange section 460, and a fission gas void section 470 [170], redundant explanation of which is omitted here for clarity. The integral MSR 404 is shown in FIG. 4 as being held in the molten salt reactor section 483a and surrounded substantially by the fission product adsorbing/absorbing material 481. In some cases, the molten salt reactor section 483a (and accompanying maintainable components section 483b) may be held at a pressure $P_v$, which may be a vacuum pressure. In other cases, $P_v$ may be adapted based on the thermal requirements of the integral MSR 404. Additionally or alternatively, the molten salt reactor section 483a may be configured to receive gas that may be adapted for emergency cooling of the vessel 405, among other uses.

The integral MSR 404 is described in greater detail below. The integral MSR 404 may include a drain tank section 420. The drain tank section 420 may be substantially analogous to the drain tank section 120 described in relation to FIGS. 1-3 and therefore may be configured to hold a volume of fuel salt away from a reactor core and/or other components that occupy the critical region 408 of the integral MSR 404. For example, and with reference to FIGS. 4 and 5, the drain tank section 420 may be configured to hold the fuel salt in the subcritical volume 414, which may generally be defined collectively by the internal barrier 422, drain tank walls 426, and floors 428. With reference to the internal barrier 422, the internal barrier 422 may be a structural component that establishes a physical barrier and physical separation between fuel salt held in the critical volume 410 and fuel salt held in the subcritical volume 414. In this regard, the internal barrier 422 may have a sufficient strength and rigidity in order to support a weight of the fuel salt within the critical region 408 without undue deformation or encroachment of the internal barrier 422 into or toward the subcritical volume 414.

The internal barrier 422 may be adapted to permit the passage of fuel salt between the critical volume 410 and the subcritical volume 414 only via the fuel salt passage 424 defined through the internal barrier 422. In order to permit the transfer of fuel salt between the critical volume 410 and the subcritical volume 414, the drain tank section 420 may further include a transfer pipe 430. The transfer pipe 430 may extend from the fuel salt passage 422 toward a floors 428 of the drain tank section 420. As shown in FIG. 4, the floors 428 may be slopped to encourage fuel salt toward the transfer pipe 430. For example, an end of the transfer pipe 430 may have a mouth 432 that is disposed adjacent to the floors 428 of the drain tank section 420. In this regard, and as described in greater detail herein, fuel salt can be transferred from the subcritical volume 414 to the critical volume 410 until said fuel salt reaches an elevational level of the mouth 432 in the subcritical volume 414.

Figure 6:
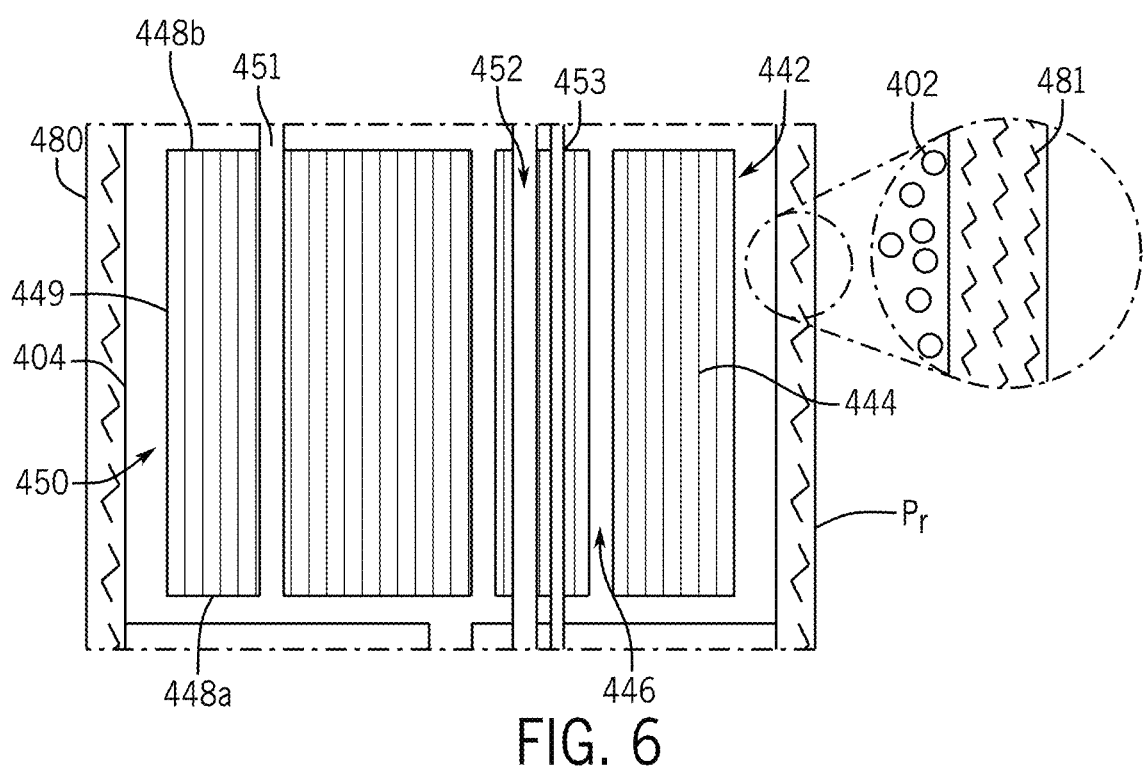
FIG. 6 depicts a reactor section of the integral molten salt reactor of FIG. 4 and adjacent fission product adsorbing/absorbing material.

The integral MSR 404 may include the reactor section 440. The reactor section 440 may be substantially analogous to the reactor section 140 described in relation to FIGS. 1-3 and therefore may be configured to receive a volume of fuel salt from the drain tank section 220 and cause fission reactions that heat the fuel salt. For example, and with reference to FIGS. 4 and 6, the reactor section 440 may generally include a reactor core 442 formed at least partially from a moderator material 444, such as a graphite material. The reactor core 442 may cause or otherwise facilitate the undergoing fission reactions in the critical region 408. Accordingly, the reactor core 442 may be constructed in a manner to receive the fuel salt and to cause the fuel salt 402 to be heated therein. In this regard, the reactor core 442 is shown in FIG. 6 as having a fuel salt passage 446 that extends generally from a core bottom side 448a to a core top side 448b. As described herein, the fuel salt 402 may be encouraged to travel through the fuel salt passage 446, and in so doing, the fuel salt 402 may be heated by fission reactions. The reactor core 442 is further shown in FIG. 6 as having peripheral sides 449. The peripheral sides 449 may generally be transverse sides to the core bottom and top sides 448a, 448b. The peripheral sides 449 may be arranged in order to define a core section passage 450 between the reactor core 442 and the vessel 404. As described herein, the fuel salt 402 may be encouraged to travel through the core section passage 450 upon removal of heat from the fuel salt at the heat exchange section 460, and for subsequent recirculation into the core 442.

The reactor core 442 may further includes various components to facilitate various other functions of the integral MSR 404. For example, the reactor core 442 is further shown in FIG. 6 as including a control rod accommodating portion 451. The control rod accommodating portion 451 may be a void or cavity that extends into the moderator material 444 and that is operable to receive one or more control rod structures and/or other structures that are operable to control reactivity of the core 442 (including components that may be used to slow or stop a nuclear reaction in core 442). Further, the reactor core 442 is shown in FIG. 6 as including a fuel loading accommodating portion 452. The fuel loading accommodating portion 452 may be a lumen, duct, or other through passage that allows for one or more fuel loading pipes to extend through the core 442 in order to reach the subcritical volume 414. In this regard, and as described herein, the subcritical volume 414 may be loaded with a fuel salt from a topmost region of the integral MSR 404, passed through the core 442, and stored in the drain tank section 420 below. The reactor core 442 is further shown in FIG. 6 as including an inert gas line accommodating portion 453. The inert gas line accommodating portion 453 may be a lumen, duct, or other through passage that allows for one or more inert lines or pipes to extend through the core 442 in order to reach the subcritical volume 414. In this regard, and as described herein the subcritical volume 414 may be pressurized with inert gas from a topmost region of the integral MSR 404.

Figure 7:
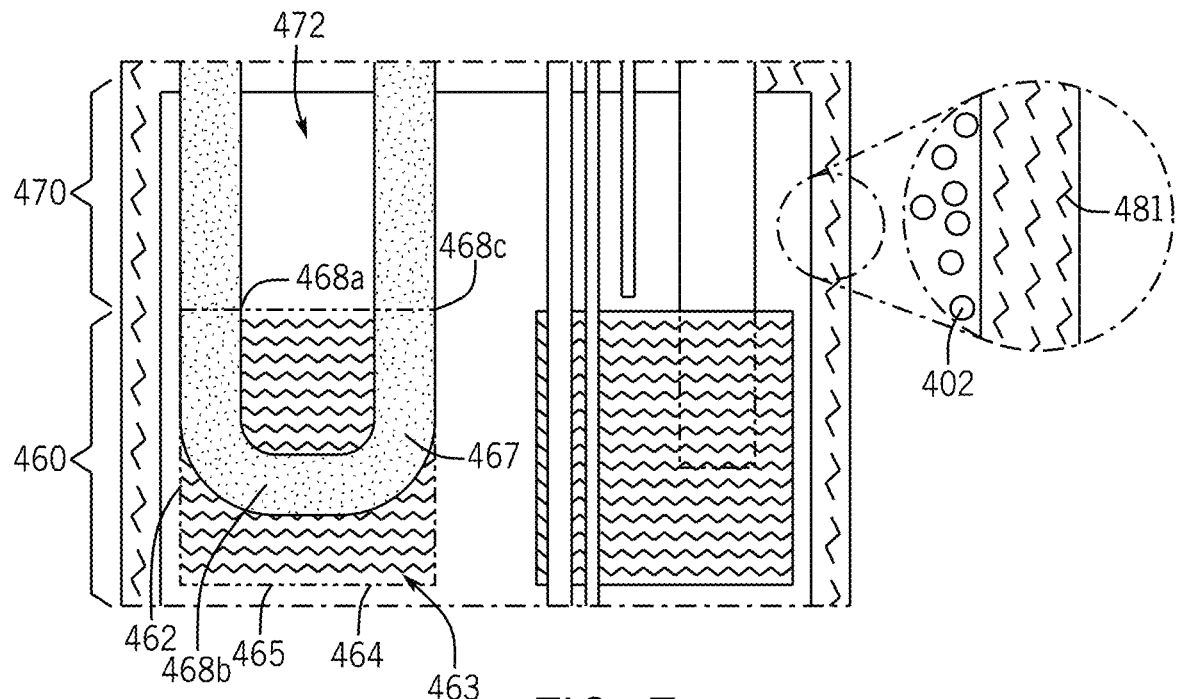
FIG. 7 depicts a heat exchange section and a fission gas void section of the integral molten salt reactor of FIG. 4 and adjacent fission product adsorbing/absorbing material.

The integral MSR 404 The integral MSR 404 may include the heat exchange section 460. The heat exchange section 460 may be substantially analogous to the heat exchange section 460 described in relation to FIGS. 1-3 and therefore may be configured to receive a flow of the heated fuel salt from the reactor section 440 and remove heat therefrom. For example, and with reference to FIGS. 4 and 7, the heat exchange section 460 is shown as having a heat exchanger 462. The heat exchanger 462 may generally take of any of variety of forms in order to transfer heat from fuel salt of the critical volume 410 to a coolant salt or other medium that is held by the heat exchanger 462. In the example of FIG. 7, the heat exchanger 462 is shown as including a shell 464 having passages 465 that lead into a heat exchange volume 463. Fuel salt (such as that which has been heated from one or more fission reactions) may be routed to the exchange volume 463. Within the volume 463, a coolant pipe run 466 having a coolant salt 467 disposed flowing there through may operate to remove heat from the fuel salt that is arranged in the exchange volume 463. In this regard, the coolant pipe run 466 may include a cold leg 468a, an interface section 468b, and a hot leg 468c. The cold leg 468a, the interface section 468b, and the hot leg 468c may cooperate to define a U-shaped member as shown in FIG. 7; however, in other cases, other shapes and configurations are contemplated. The cold leg 468a may generally include the coolant salt in a reduced temperature format. The interface section 468b may be in contact with the heated fuel salt that traverses through the heat exchanger 462 in the exchange volume 463. In turn, the heat from the heated fuel salt may be transferred to the coolant salt 467 held within the interface section 468b. Subsequently, the coolant salt 467 in elevated temperature format (due to the transfer of heat from the fuel salt) may exit the heat exchanger 462 via the hot leg 468c. As described herein, the elevated temperature coolant salt 467 from the hot leg 468c may be used for a variety of purposes, including electrical power generation, chemical processes, and the like. With further reference to FIG. 7, the fission gas void space 470 is shown, which may be a head space of the vessel 405 arranged above the heat exchanger section 460.

The integral MSR 404 may further include a variety of other components to support the operation of the reactor. Such components may be maintainable or replaceable components for which it may be desirable to arrange such components in a contained volume to mitigate the release of any gasses therefrom. In this regard, and with reference to FIGS. 4 and 8, the integral MSR 404 is shown as associated with a collection of maintainable components 499. The maintainable components 499 are shown as being arranged in the maintainable components section 483b of the containment volume 482. The maintainable components 499 are further shown as being surrounded and encompassed by the fission product adsorbing/absorbing material 481. The maintainable components 499 may, collectively, include components associated with one or more of the coolant system 180a, the pumping system 180b, the control system 180c, the fuel loading system 180d, and/or the inert gas system 180e, as described above in relation to FIG. 1.

Figure 8:
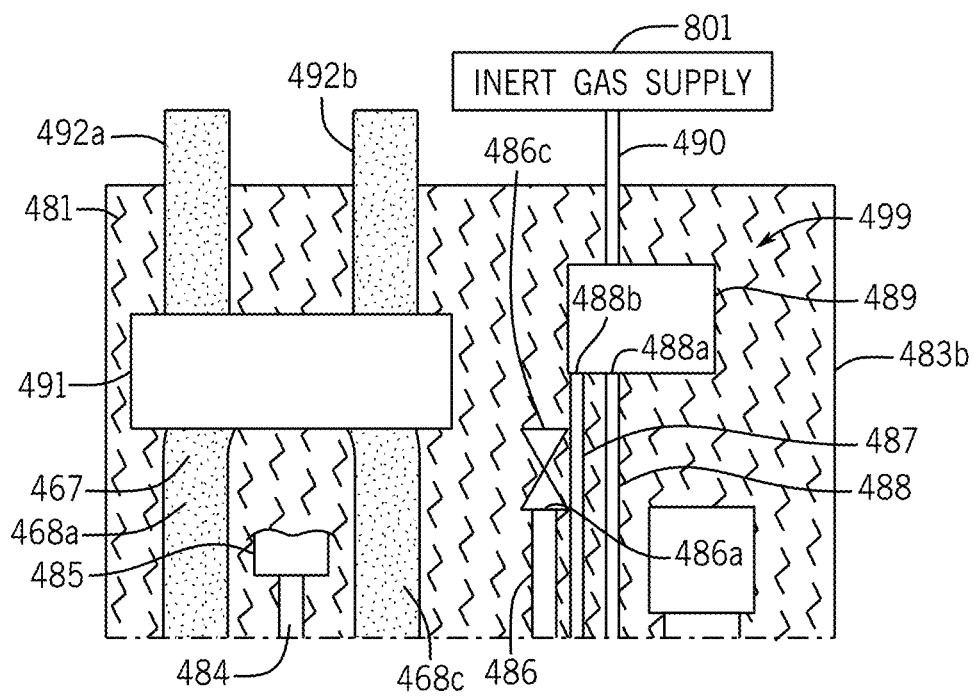
FIG. 8 depicts a maintainable components section of the containment system of FIG. 4.

In the example of FIGS. 4 and 8, the maintainable components 499 are shown as including a control rod 484 and as associated reactivity control system 485. The control rod 484 may be a calibrated piece of metal that is selectively lowered and raised into the reactor 442 in order to reduce or stop a nuclear reaction occurring therein. The reactivity control system 485 may include any of a variety of mechanical components that are configured for control the reactivity control elements described herein. In one example, the reactivity control system 485 may include certain gears, levers, and other mechanisms that allow for the control rod 484 to be selectively raised or lowered into the reactor vessel 405. As further shown in FIG. 4, the integral MSR 404 may be associated with a fuel load line 486. The fuel load line 486 may be a pipe or conduit that is operable to carry a fuel salt from an environment exterior to the integral MSR 404 to the subcritical volume 414. For example, the fuel load line 486 may including a loading end 486a that is arranged outside of the vessel 405 and that is adaptable to receive a load of fuel salt therein, such as through a valving 486c. The fuel load line 486 may further include a dispending end 486b that is arranged within the subcritical volume 414. In this regard, the fuel salt received at the loading end 486a and valving 486c may be routed to through the fuel load line 486 and to the subcritical volume 414 for dispensing thereto via the loading end 486a.

As further shown in FIGS. 4 and 8, the integral MSR 404 may include a pair of inert gas lines, including a subcritical gas line 487 and a critical region gas line 488. Each of the gas lines 487, 488 may be operable to control a pressure in the vessel 405. For example, the subcritical gas line 487 may have a loading end 487a that is operable to receive a flow of inert gas for routing to a dispensing end 487b that is arranged within the subcritical volume 414. Accordingly, a flow of inert gas can be controlled in order to control a pressure $P_{dt}$ of the subcritical volume 414, thereby controlling a pressure in the drain tank section 420. Further, the critical gas line 488 may have a loading end 488a that is operable to receive a flow of inert gas for routing to a dispensing end 488b that is arranged with the critical volume 410. Accordingly, a flow of inert gas can be controlled in order to control a pressure $P_{ht}$ of the heat exchange section 460 of the critical volume 410, and to control a pressure $P_r$ of the reactor section 440 of the critical volume 410.

The inert gas lines 487, 488 may each be coupled with an inert gas system 489. The inert gas system 489 may include any of a variety of pumps, compressors, controllers and the like that are configured to cooperate to control the delivery of inert gas to the integral MSR 404 and the maintenance of pressure in the critical region 408 and subcritical region 412. For example, the inert gas system 489 may receive a supply of inert gas from supply line 490 that is ultimately coupled with an inert gas supply 801 of FIG. 8. In some cases, the inert gas supply 801 may be a vessel containing inert gas and/or other source of inert gas.

With further reference to FIGS. 4 and 8, such maintainable components 499 may include a coolant system 491. The coolant system 491 may generally include any of a variety of components that allows the coolant salt 467 to be exchanged with the heat exchanger 462 within the vessel 405 and to extract heat from said coolant salt 467 for use in additional processes. Accordingly, the coolant system 491 may include a secondary heat exchanger, such as any appropriate type of heat exchanger that operates to remove the heat from the coolant salt 467. In this regard, coolant system 491 may receive the hot leg 468c of the coolant pipe run 466, and transfer said heat to a secondary coolant that enters the coolant system 491 in a lower temperature format into via a cold leg 492a. The coolant system 491 may then cause the secondary coolant to exit the coolant system 491 at a secondary coolant hot leg 492b, which may be further routed to various other external processes, including those used for electricity generation, chemical processes, and the like.

FIGS. 4 and 8 further depict the maintainable components as including an optional salt pump 495. The salt pump 495 is shown as having a motor 496, a housing 497, and an impeller 498. The salt pump 495 may take a variety of forms, and may be salt-wetted component. Broadly, the motor 496 may cause a shaft (not shown) to drive the impeller 498 and thus induce a flow of fuel salt in the critical volume 410. In some cases, the salt pump 495 may be a magnetic drive pump so as to eliminate the need for mechanical seals and thereby reduce potential leak paths and fail points for the fuel salt via the salt pump 495.

As shown throughout FIGS. 4-8, the collection of maintainable components 499 may be surrounded by the fission product adsorbing/absorbing material 481. For example, the fission product adsorbing/absorbing material 481 may be disposed throughout the containment volume 482 so that any components disposed therein are at least partially encompassed by the fission product adsorbing/absorbing material. With reference to FIG. 4, the fission product adsorbing/absorbing material 481 is shown arranged in the integral molten salt reactor section 483a such that the fission product adsorbing/absorbing material 481 surrounds the integral MSR 404. Further shown in FIGS. 4 and 8, the fission product adsorbing/absorbing material 481 is arranged in the maintainable components section 483b such that the fission product adsorbing/absorbing material 481 surrounds some or all of the collection of maintainable components 499. In this regard, in the events of a leak or emission of fission gasses from the maintainable components 499, such gas may be captured by the fission product adsorbing/absorbing material 481 and additionally contained within the containment volume 482 of the sealed containment structure 480.

Figure 9:
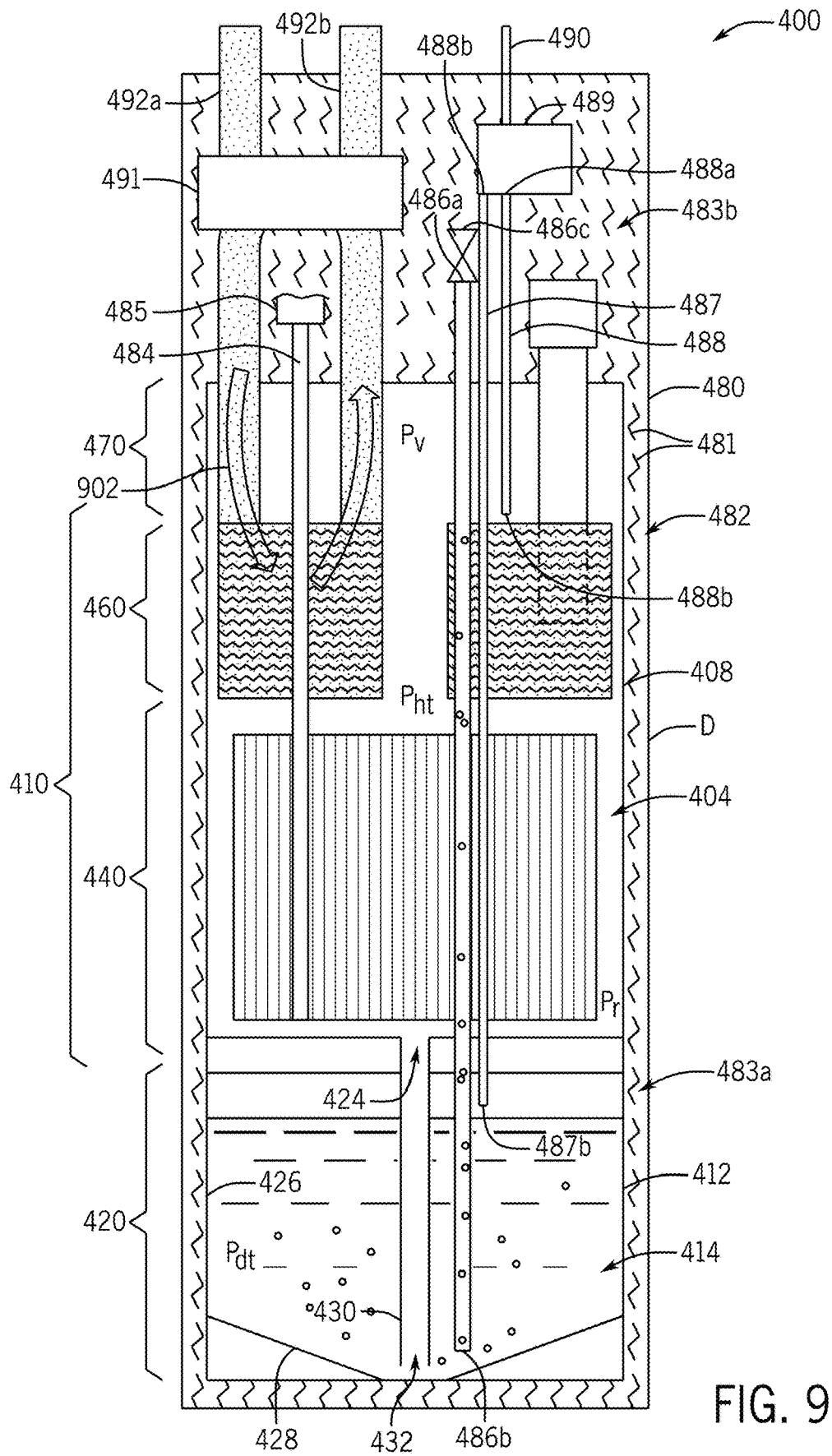
FIG. 9 depicts the containment system of FIG. 4 in a first configuration.

In operation, the integral MSR 404 may be used to selectively control a disposition of the fuel salt 402 as between the critical volume 410 and the subcritical volume 414. The integral MSR 404 may further in operation be used to generate heat through fission reactions, which heat may be removed through the continuous circulation of fuel salt with the critical volume 410 and through the heat exchange section 460. In this regard, for the sake of illustration, FIG. 9 depicts the integral MSR 404 in a first configuration D. In the first configuration D, the integral MSR 404 may use a coolant salt or gas to heat the vessel 405. For example, the coolant salt 467 may be routed through the heat exchanger 462 along circulation path 902. On startup, in the configuration D shown in FIG. 9, the coolant salt 467 may have an elevated temperature profile as compared to an ambient temperature of the vessel 405, thereby permitting the coolant salt 467 to heat the vessel 405 in the configuration D. In some cases, a heated gas may be used in place of the coolant salt 467 to heat the vessel 405. As is further shown in the first configuration D, the fuel salt 402 may be loaded into the subcritical region 414. For example, the fuel 402 salt may be introduced into the fuel load line 486 and caused to flow into the subcritical volume 414 via the fuel load line 486.

Figure 10:
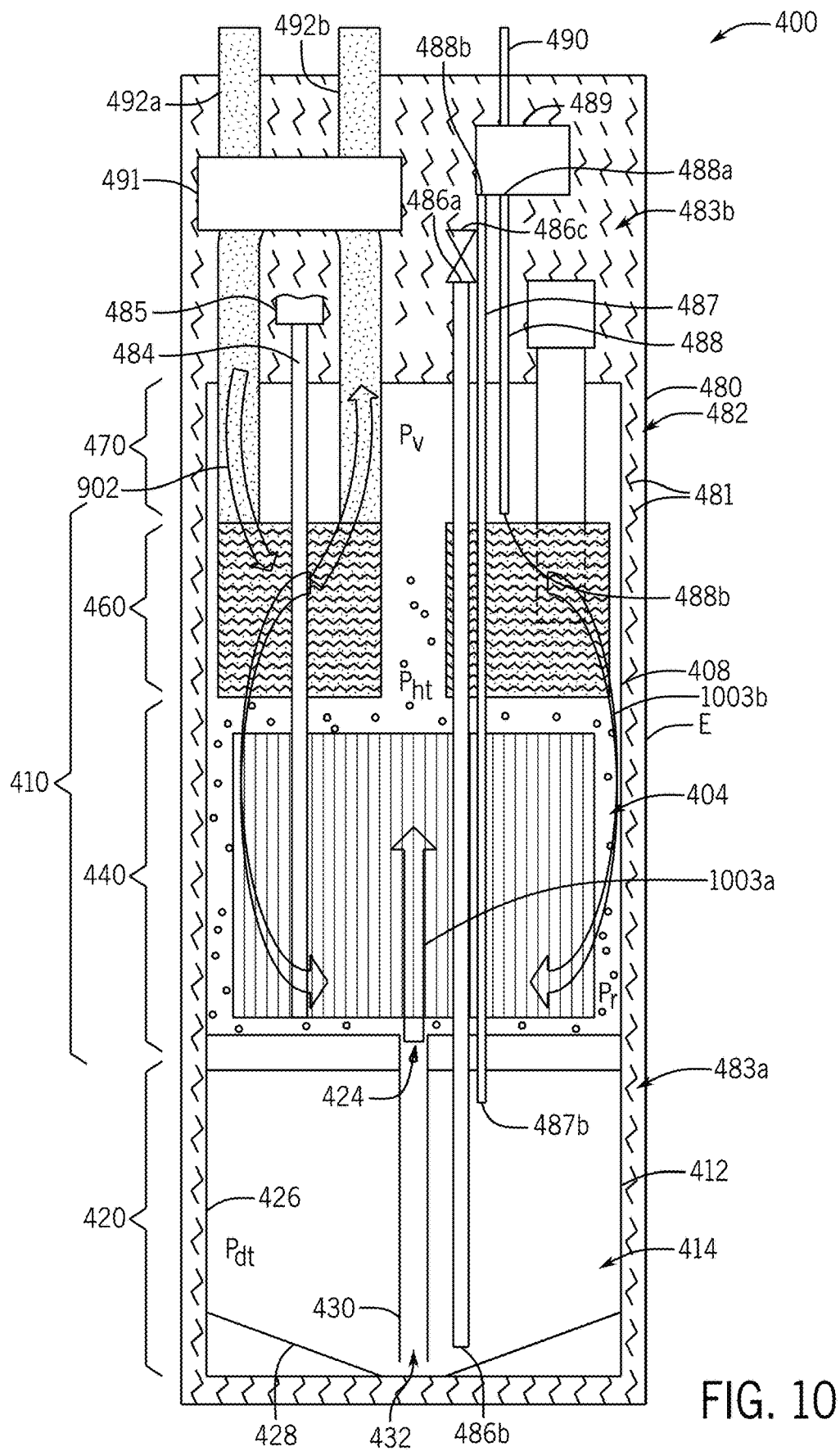
FIG. 10 depicts the containment system of FIG. 4 in a second configuration.

The integral MSR 404 may be further operable to cause the fuel salt 402 to selectively transfer from the subcritical region 414 to the critical region 410. For example, the inert gas lines 487, 488 may be operated in order to control a pressure in each of the critical volume 410 and the subcritical volume 414 and to create a pressure differential therebetween that causes the selective transfer of fuel salt between the critical and subcritical volumes 410, 414. To illustrate, FIG. 10 shows a loading of the fuel salt 402 into the critical volume 410 from the subcritical volume 414 and operation of the integral MSR 404 in a second configuration E. To accomplish said loading, inert gas may be provided to the subcritical region gas line 487 in order to cause the pressure $P_{dt}$ of the subcritical region 412 to increase relative to the pressures $P_{ht}$, $P_r$ of the critical region 410. The fuel salt 402 held with the subcritical volume 414 may be exposed to both the pressure $P_{dt}$ and the pressure $P_r$ (via the transfer pipe 430). Accordingly, the pressure differential as between $P_{dt}$ and $P_r$ may induce a flow of the fuel salt 402 from the subcritical volume 414 (having a higher pressure) to the critical volume 410 (having a lower pressure) that causes the fuel salt 402 to transfer from the subcritical volume 414 to the critical volume 410 via the transfer pipe 430. In order to maintain the fuel salt 402 in the critical volume 414, the pressure $P_{dt}$ may be maintained at a high pressure than either $P_r$ or $P_{ht}$ during the operation of the reactor. Upon entry of the fuel salt 402 into the critical region 408, the fuel salt 402 may be circulated along a circulation path 1003a extending up through the reactor core 442 where the fuel salt 402 may undergo a fission reaction that heats the fuel salt 402. The fuel salt 402 may be received by the heat exchanger 462 of the heat exchange section 460 from the circulation path 1003a in order to remove the heat from the fuel salt 402, such as via the coolant salt 467 traversing the circulation path 902, as described herein). Subsequently, the fuel salt may proceed along a circulation path 1003b that extends along a periphery of reactor 442, such as through the core section passage 450 in order to return the fuel salt 402 to the reactor core 442 for further fission reactions, operating a continuous loop in this manner during operation of the integral MSR 400.

Figure 11:
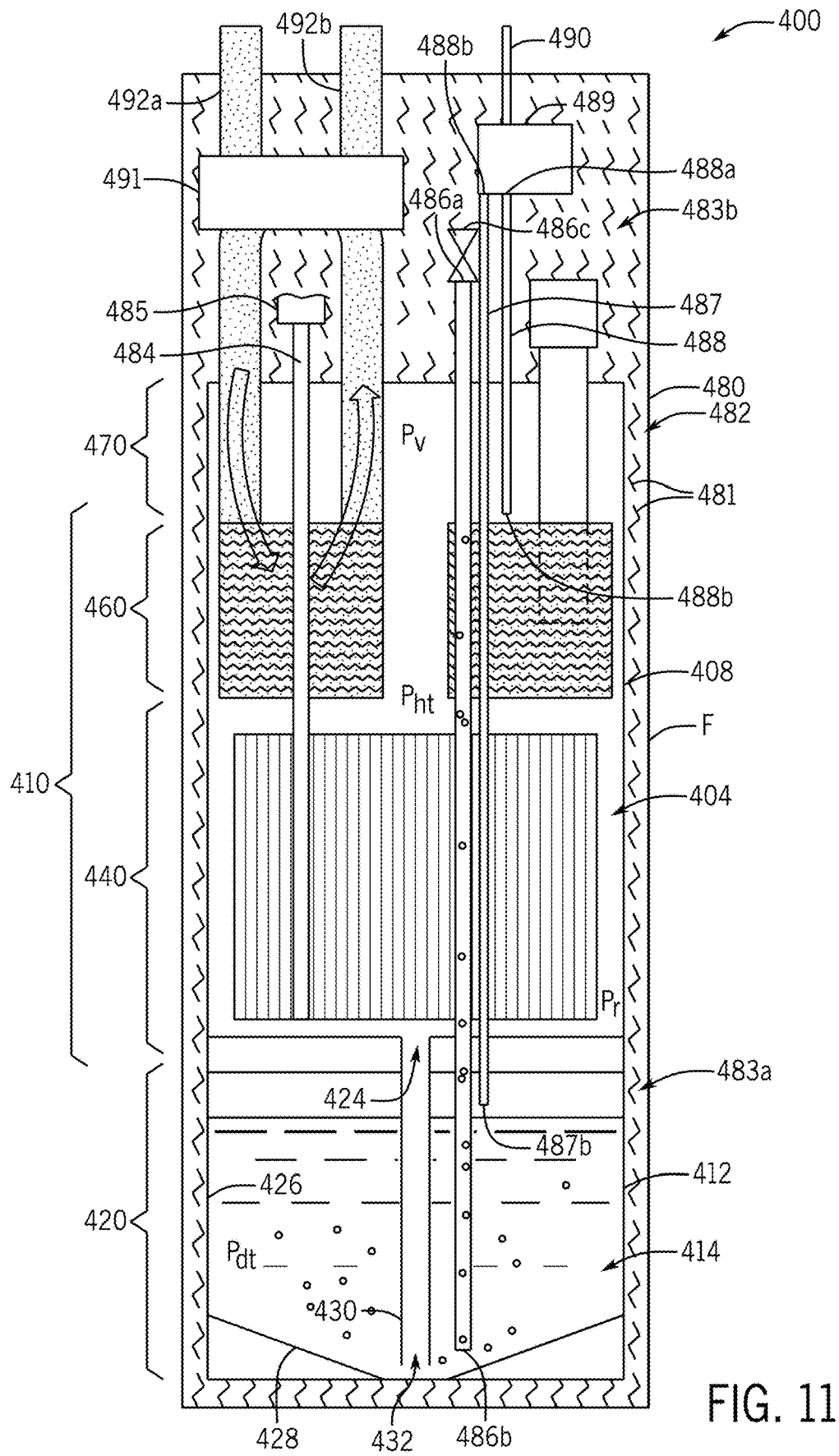
FIG. 11 depicts the containment system of FIG. 4 in a third configuration.

The configuration E of the integral MSR 404 shown in reference to FIG. 10 may be considered an active state of the reactor because the configuration E requires the ongoing, continuous pressurization of the fuel salt passage 424 in order to retain the fuel salt 402 in the critical region 408. Upon depressurization of the fuel salt passage 424 (and upon depressurization of the subcritical volume 414 more generally), the fuel salt 402 may flow, passively and gravitationally from the critical volume 410 to the subcritical volume 414 via the fuel salt passage 424. In this regard, FIG. 11 shows a third configuration F of the integral MSR 404 in which the fuel salt 402 is caused to flow from the critical volume 410 to the subcritical volume 414. For example, the subcritical region gas line 487 and the critical region gas line 488 may be operational in order to cause the pressure $P_{dt}$ to be less than or equal to the pressures $P_r$, $P_{ht}$. On the establishment of such pressures, the fuel salt 402 may no longer be prevented from entering the drain tank section 420, and may therefore flow freely thereto. On flowing freely into the drain tank section 420, the fuel salt 402 may be positioned away from the reactor core 442 and/or generally away from components of the integral MSR 404 that may otherwise cause the fuel salt 402 to be heated. In this regard, the fuel salt 402 may be allowed to be cooled and stored safely during a shutdown event in the subcritical volume 414. Further, the change in pressure $P_{dt}$ may be caused by either an intentional event (e.g., such the lowering of the pressure $P_{dt}$) or an unintentional event (e.g., an emergency loss of power or other event that results in the failure of the integral MSR 404 to maintain the pressure $P_{dt}$). Accordingly, the drain tank section 420 may serve as a passive safety system that collects the fuel salt 402 away from the reactor core 442 during an emergency event because said emergency event causes the fuel salt 402 to be routed to subcritical geometry of the drain tank section 420 by default.

The containment system 400, as shown in FIGS. 9-11 provides a passive safety systems for the integral MSR 404 that operates, passively, in each of the configurations D-F described above. For example, the containment system 400 provides the containment volume 482 fully about the integral MSR 404 so that the integral MSR 404 is fully enclosed therein. The containment volume 482, as described herein, is filled with the fission product adsorbing/absorbing material 481. In this regard, in the event of a release event of gas from the integral MSR 404, in any of the configurations D-F, such gasses may be trapped by the fission product adsorbing/absorbing material 481 and contained within the containment volume 482 of the sealed containment structure 480. Similarly, in the event of a release event of gas from any components of the collection of maintainable components 499, such gasses may be trapped by the fission product adsorbing/absorbing material 481 and contained within the containment volume 482 of the sealed containment structure 480. This redundant and passive safety system, in connection with the fission gas void space 470, as described herein, may allow the integral MSR 404 to be constructed and operated free from any off-gas system. For example, gas from the fuel salt 402 may be fully contained by the fission gas void space 470, and the adjacent fission product adsorbing/absorbing material 481 and containment volume 482 may provide passive safety redundancy in the event of any release event of said gas, thereby reducing or eliminating the need for an off-gas system.

Figure 12:
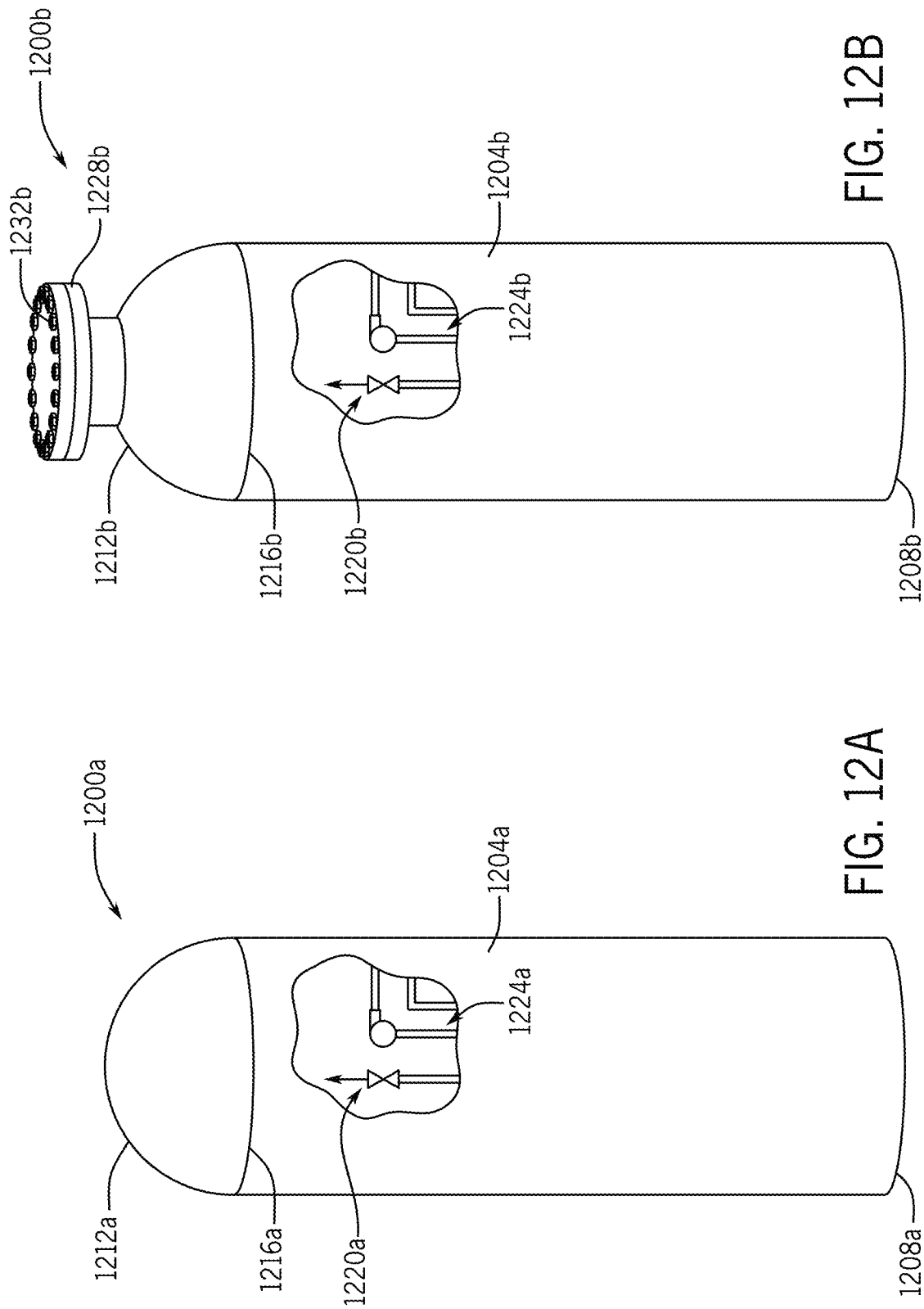
FIG. 12A depicts an example sealed containment structure of the present disclosure.
FIG. 12B depicts another example sealed containment structure of the present disclosure.

The containment systems described herein may be adapted to facilitate the maintenance of the functional or maintainable components of an integral MSR. For example, it may be desirable for such maintainable components to generally be held in a sealed environment (such as that provided by the sealed containment structure) but to also be accessible for maintenance and replacement when needed. With reference to FIGS. 12A and 12B, example containment systems 1200a, 1200b are shown that facilitate the ability to maintain and replace such components. For example, and with reference to FIG. 12A, the containment system 1200a is shown as including a sealed containment structure 1204a that includes a main portion 1208a and a cap portion 1212a. The main portion 1208a and the cap portion 1212a may be joined along a weld seam 1216a. As shown in the cutaway view of FIG. 12A, the main portion 1208a may house a collection of maintainable components 1220a in a maintainable components section 1224a of the sealed containment structure 1204a. In the example of FIG. 12A, the sealed containment structure 1204a may be sealed view the weld seam 1216a. The maintainable components 1220a may be accessed by opening the sealed containment structure 1204a along the weld seam 1216a such that maintainable components may be accessed without disturbing or opening or removing any integral MSR that is housed by the sealed containment structure 1204a.

With reference to FIG. 12B, the containment system 1200b may be substantially analogous to the containment system 1200a and include a sealed containment structure 1204b, a main portion 1208b, a cap portion 1212b, a weld seam 1216b, a collection of maintainable components 1220b, and a maintainable components section 1224b. Notwithstanding the foregoing similarities, the containment system 1200b is further shown in FIG. 12B as including an access feature 1228b with a flange cap 1232b. The access feature 1228b may generally permit access to the collection of maintainable components 1220b without opening the weld seam 1216b and/or otherwise engaging in an weld activity with the vessel. For example, the flange cap 1232b can be repeatedly removed and resealed, as needed, in order to access the maintainable components 1220b for repair and replacement over the operational life of any integral MSR contained within the containment system 1200b. The access feature 1228b therefore provides access to the maintainable components 1220a without disturbing or opening or removing any such integral MSR that is housed by the sealed containment structure 1204b.

Figure 13:
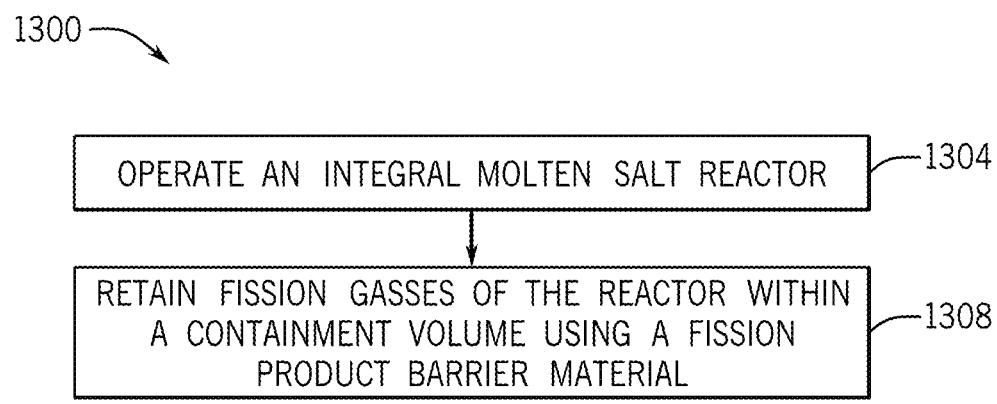
FIG. 13 depicts a flow diagram of a method constructing a containment system for an integral molten salt reactor.

FIG. 13 depicts a flow diagram of a method 1300 for constructing a containment system for an integral molten salt reactor. At operation 1304, an integral molten salt reactor is operated. The integral molten salt reactor is housed fully within a containment volume of a sealed containment structure. The integral molten salt reactor may permit circulation of a fuel salt therein and allow for export of heat from said fuel salt. For example, and with reference to FIGS. 9-13, the integral 404 is operated with respect to the configurations D-F described herein. All such operations of the integral MSR 404 commence and continuous while the integral MSR 404 is arranged fully within the sealed containment structure 480 and while being at least partially surrounded by the fission product adsorbing/absorbing material 481.

At operation 1308, upon a release event from the integral molten salt reactor, fission gasses are retained within a containment volume using a fission product adsorbing/absorbing material in cooperation with a sealed containment structure. For example, and with reference to FIGS. 9-11, in the event of a release of any gasses from the integral MSR 404, such gases may be captured by the fission product adsorbing/absorbing material 481. Further, in the event of a release of any gasses from the maintainable components 499, such gases may be captured by the fission product adsorbing/absorbing material 481. In either cases, such gases may be further contained within the sealed containment volume 482 of the sealed containment structure 480.

Other examples and implementations are within the scope and spirit of the disclosure and appended claims. For example, features implementing functions may also be physically located at various positions, including being distributed such that portions of functions are implemented at different physical locations. The foregoing description, for purposes of explanation, uses specific nomenclature to provide a thorough understanding of the described examples. However, it will be apparent to one skilled in the art that the specific details are not required in order to practice the described examples. Thus, the foregoing descriptions of the specific examples described herein are presented for purposes of illustration and description. They are not targeted to be exhaustive or to limit the examples to the precise forms disclosed. It will be apparent to one of ordinary skill in the art that many modifications and variations are possible in view of the above teachings.

What is claimed is:

1. A containment system for an integral molten salt reactor comprising
an integral molten salt reactor comprising
an integrally constructed vessel defining a critical region and a subcritical region,
a heat exchanger disposed within the critical region,
a reactor core disposed within the critical region,
a drain tank disposed within the subcritical region, wherein the heat exchanger, reactor core, and drain tank are fully enclosed within the integrally constructed vessel, and
a fuel salt,
wherein the integral molten salt reactor is configured to
circulate the fuel salt within the critical region,
heat the fuel salt via fission reactions caused within the reactor core,
export heat from the fuel salt at the heat exchanger, and
upon a shutdown event, cause the fuel salt to gravitationally transfer to the drain tank by altering a pressure differential between the critical region and the subcritical region;
a sealed containment structure defining a containment volume, wherein the integrally constructed vessel is fully disposed within the containment volume, and wherein the sealed containment structure surrounds a fission product adsorbing/absorbing material positioned within the containment volume and radially outside of the integrally constructed vessel, the fission product adsorbing/absorbing material encompassing the integrally constructed vessel, such that the heat exchanger, the reactor core, and the drain tank are surrounded by the fission product adsorbing/absorbing material; and
an inert gas system comprising
a subcritical region gas line extending into the drain tank configured to deliver an inert gas to the drain tank thereby changing a pressure of the drain tank; and
a critical region gas line extending into the integrally constructed vessel, terminating proximal to the reactor core and configured to deliver the inert gas to the critical region thereby changing a pressure of the critical region;
wherein the fission product adsorbing/absorbing material at least partially encompasses the subcritical region gas line and the critical region gas line; and
wherein the inert gas system is configured to alter the pressure differential between the critical region and the subcritical region by manipulating the pressure of the drain tank and the pressure in the critical region via selective delivery of the inert gas through the subcritical region gas line and the critical region gas line, thereby selectively causing the fuel salt to circulate to the critical region or the subcritical region.

2. The system of claim 1, wherein the sealed containment structure defines
an integral molten salt reactor section configured to house the integral molten salt reactor therein, and
a maintainable components section extending continuous from the integral molten salt reactor section and configured to house a collection of maintainable components that are associated with an operation of the integral molten salt reactor.

3. The system of claim 2, wherein the fission product adsorbing/absorbing material is disposed throughout the containment volume such that the integral molten salt reactor section and the maintainable components section are encompassed by the fission product adsorbing/absorbing material.

4. The system of claim 1, wherein the sealed containment structure and the fission product adsorbing/absorbing material included therein cooperate to retain fission gasses upon a release event of said fission gasses from the integral molten salt reactor.

5. The system of claim 4, wherein the integral molten salt reactor is free from an external off-gas system.

6. The system of claim 1, wherein the integrally constructed vessel further defines
a fission gas void section defining a head space of the integrally constructed vessel configured to hold a gas emanating from the fuel salt that is enclosed therein.

7. The system of claim 2, wherein the sealed containment structure is configured to permit access to the collection of maintainable components without disturbing the fuel salt of the integral molten salt reactor held within the sealed containment structure.

8. The system of claim 2, wherein
the system further comprises the collection of maintainable components, and
the collection of maintainable components comprises one or more components of the inert gas system, a coolant system, or a salt pump.

9. The system of claim 8, wherein
the subcritical region gas line extends from the maintainable components section of the containment volume and into the integrally constructed vessel, terminating in the drain tank,
the critical region gas line extends from the maintainable components section of the containment volume and into the integrally constructed vessel, terminating proximal to the heat exchanger or the reactor core,
the fission product adsorbing/absorbing material encompasses a portion of the subcritical region gas line within the maintainable components section, and
the fission product adsorbing/absorbing material encompasses a portion of the critical region gas line within the maintainable components section.

10. The system of claim 9, wherein
the one or more components of the inert gas system comprises an inert gas supply line, extending in part through the maintainable components sections, and configured to deliver inert gas to each of the subcritical region gas line and the critical region gas line, and
the fission product adsorbing/absorbing material encompasses the inert gas supply line within the maintainable components section.

11. The system of claim 8, wherein
the collection of maintainable components comprises one or more components of a coolant system,
the coolant system comprises a cold leg, an interface section, and a hot leg disposed within the maintainable components section of the containment volume, and
the cold leg, the interface section, and the hot leg defining a U-shaped member configured to transfer heat exported from the heat exchanger of the integral molten salt reactor.

12. The system of claim 11, wherein the fission product adsorbing/absorbing material encompasses the cold leg, the interface section, and the hot leg within the maintainable components section.

13. The system of claim 8, wherein
the collection of maintainable components comprises one or more components of a salt pump,
the salt pump comprises a motor disposed fully within the maintainable components section of the containment volume, and
the motor is configured to induce a circulation of the fuel salt within the critical region.

14. The system of claim 1, wherein
the reactor core comprises a plurality of fuel salt passages extending through a thickness of the core, and
the integrally constructed vessel is configured to circulate the fuel salt through the fuel salt passages whereat the fuel salt undergoes nuclear fission reactions, and further circulate the fuel salt about a periphery of the reactor core upon export said heat from the fuel salt at the heat exchanger.

15. A containment system for an integral molten salt reactor comprising
an integral molten salt reactor comprising
an integrally constructed vessel defining a critical region and a subcritical region,
a heat exchanger disposed within the critical region,
a reactor core disposed within the critical region,
a drain tank disposed within the subcritical region, wherein the heat exchanger, reactor core, and drain tank are fully enclosed within the integrally constructed vessel, and
a fuel salt,
wherein the integral molten salt reactor is configured to circulate the fuel salt within the critical region, heat the fuel salt via fission reactions caused within the reactor core, and
export heat from the fuel salt at the heat exchanger; and
a sealed containment structure defining a containment volume, wherein the integrally constructed vessel and a maintainable components section is fully disposed within the containment volume, and wherein the sealed containment structure surrounds a fission product adsorbing/absorbing material positioned within the containment volume and radially outside of the integrally constructed vessel, the fission product adsorbing/absorbing material encompassing the integrally constructed vessel and the maintainable components section, such that a control rod is surrounded by the fission product adsorbing/absorbing material; and
an inert gas system comprising
a subcritical region gas line extending into the drain tank configured to deliver an inert gas to the drain tank thereby changing a pressure of the drain tank;
a critical region gas line extending into the integrally constructed vessel, terminating proximal to the reactor core configured to deliver the inert gas to the critical region thereby changing a pressure of the critical region;
wherein the fission product adsorbing/absorbing material at least partially encompasses the subcritical region gas line and the critical region gas line; and
wherein the inert gas system is configured to alter the pressure differential between the critical region and the subcritical region by manipulating the pressure of the drain tank and the pressure in the critical region via selective delivery of the inert gas through the subcritical region gas line and the critical region gas line, thereby selectively causing the fuel salt to circulate to the critical region or the subcritical region.

16. The system of claim 15, wherein the maintainable components section extends continuously from an integral molten salt reactor section and is configured to house a collection of maintainable components comprising one or more pumps, valves, compressors, or heat exchangers.

17. The system of claim 15, wherein the fission product adsorbing/absorbing material comprises an iodine absorbing material or a tritium absorbing material.

18. The system of claim 15, wherein the integrally constructed vessel further defines
a fission gas void section defining a head space of the integrally constructed vessel configured to hold a gas emanating from the fuel salt that is enclosed therein.

19. The system of claim 16, wherein the sealed containment structure is configured to permit access to the collection of maintainable components without disturbing the fuel salt of the integral molten salt reactor held within the sealed containment structure.

* * * * *